(12) United States Patent
Naoe et al.

(10) Patent No.: US 9,743,437 B2
(45) Date of Patent: *Aug. 22, 2017

(54) MOBILE COMMUNICATION SYSTEM

(71) Applicant: SHARP KABUSHIKI KAISHA, Osaka-Shi, Osaka (JP)

(72) Inventors: Hirokazu Naoe, Osaka (JP); Masafumi Aramoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 198 days.

This patent is subject to a terminal disclaimer.

(21) Appl. No.: 14/823,540

(22) Filed: Aug. 11, 2015

(65) Prior Publication Data

US 2015/0351141 A1    Dec. 3, 2015

Related U.S. Application Data

(63) Continuation of application No. 13/259,071, filed as application No. PCT/JP2010/002185 on Mar. 26, 2010, now Pat. No. 9,137,833.

(30) Foreign Application Priority Data

Mar. 27, 2009    (JP) .................................. 2009-079962

(51) Int. Cl.
*H04W 76/02* (2009.01)
*H04L 29/12* (2006.01)
(Continued)

(52) U.S. Cl.
CPC ....... *H04W 76/022* (2013.01); *H04L 61/6059* (2013.01); *H04W 8/26* (2013.01); *H04W 40/24* (2013.01); *H04W 84/18* (2013.01)

(58) Field of Classification Search
CPC ..... H04W 76/022; H04W 76/02; H04W 8/26; H04W 40/24; H04W 84/18; H04L 61/6059; H04L 61/6018
(Continued)

(56) References Cited

U.S. PATENT DOCUMENTS 6,763,012 B1    7/2004  Lord et al.
8,566,455 B1 *  10/2013 Zhao ................... H04W 76/025
                                                   709/227
(Continued)

FOREIGN PATENT DOCUMENTS

JP    2003-298619 A    10/2003
JP    2004-507905 A     3/2004
(Continued)

OTHER PUBLICATIONS

3GPP, 3rd Generation Partnership Project; "Technical Specification Group Core Network; Packet Domain; Mobile Station (MS) supporting Packet Switched Services (Release 8)", 3GPP TS 27.060 V8.0.0 (Dec. 2008), pp. 1-33.
(Continued)

*Primary Examiner* — Kwang B Yao
*Assistant Examiner* — Syed M Bokhari
(74) *Attorney, Agent, or Firm* — Birch, Stewart, Kolasch & Birch, LLP

(57)    ABSTRACT

A mobile station (MS) that sends a request message for establishing only one PDN connection which provides connectivity to a PDN associated with an APN, the PDN connection being used only for a communication between an external gateway device (EGD) and a plurality of terminal devices which include said at least one terminal device. The MS receives the APN, an EPS bearer ID, and an address block, the address block being allocated by the EGD to the PDN connection, and the EPS bearer ID being allocated to
(Continued)

the PDN connection. The MS allocates an IPv6 prefix based on the address block to the at least one terminal device, and transfers, based on the EPS bearer ID, user data as a router from the at least one terminal device to the PDN associated with the APN via the PDN connection, wherein the user data being transferred from the terminal devices using an IP address configured based on the assigned IPv6 prefix.

10 Claims, 17 Drawing Sheets

(51) Int. Cl.
H04W 8/26 (2009.01)
H04W 40/24 (2009.01)
H04W 84/18 (2009.01)

(58) Field of Classification Search
USPC ............................................. 370/329
See application file for complete search history.

(56) References Cited

U.S. PATENT DOCUMENTS

| | | | |
|---|---|---|---|
| 2002/0145993 A1 | 10/2002 | Chowdhury et al. |
| 2002/0172207 A1 | 11/2002 | Saito et al. |
| 2003/0081578 A1 | 5/2003 | White et al. |
| 2004/0184465 A1 | 9/2004 | Lee et al. |
| 2006/0171387 A1 | 8/2006 | Kang et al. |
| 2006/0239266 A1 | 10/2006 | Babbar et al. |
| 2007/0186100 A1 | 8/2007 | Wakameda |
| 2007/0249349 A1 | 10/2007 | Park |
| 2007/0291670 A1 | 12/2007 | Pettersson et al. |
| 2010/0008507 A1 | 1/2010 | Galante et al. |
| 2010/0122824 A1 | 5/2010 | Aamodt |
| 2010/0199332 A1 | 8/2010 | Bachmann et al. |
| 2011/0122824 A1 | 5/2011 | Muhanna et al. |
| 2013/0010645 A1 | 1/2013 | Yu |

FOREIGN PATENT DOCUMENTS

| | | |
|---|---|---|
| JP | 2006-261902 A | 9/2006 |
| JP | 2006-520548 A | 9/2006 |
| JP | 2007-208855 A | 8/2007 |
| JP | 2008-511222 A | 4/2008 |
| JP | 2008-538690 A | 10/2008 |
| JP | 2010-530680 A | 9/2010 |
| KR | 10-2004-0069878 A | 8/2004 |
| KR | 10-2008-0041989 A | 5/2008 |
| WO | WO 00/76249 A1 | 12/2000 |
| WO | WO 03/075517 A2 | 9/2003 |
| WO | WO 2004/084492 A1 | 9/2004 |
| WO | WO 2006/116190 A2 | 11/2006 |
| WO | WO 2008/155066 A2 | 12/2008 |

OTHER PUBLICATIONS

3GPP, 3rd Generation Partnership Project; "Technical Specification Group Services and System Aspects; General Packet Radio Service (GPRS) enhancements for Evolved Universal Terrestrial Radio Access Network (E-UTRAN) access (Release 8)", 3GPP TS 23.401 V8.5.0 (Mar. 2009), pp. 1-222.
Final Office Action issued Nov. 3, 2014, in U.S. Appl. No. 13/259,071.
International Search Report dated Jun. 29, 2010, issued in PCT Application No. PCT/JP2010/002185.
Non-Final Office Action issued Jul. 8, 2013, in U.S. Appl. No. 13/259,071.
Non-Final Office Action issued Mar. 11, 2014, in U.S. Appl. No. 13/259,071.
Notice of Allowance and Fee(s) Due issued May 1, 2015, in U.S. Appl. No. 13/259,071.
W. Choi, et al., "Designing a Novel Unlicensed Nomadic Access Relay Station in IEEE 802.16-based Wireless Access Networks", IEEE VTS Vehicular Technology Conference Proceedings, IEEE, US, Apr. 1, 2007, pp. 2961-2965.

* cited by examiner

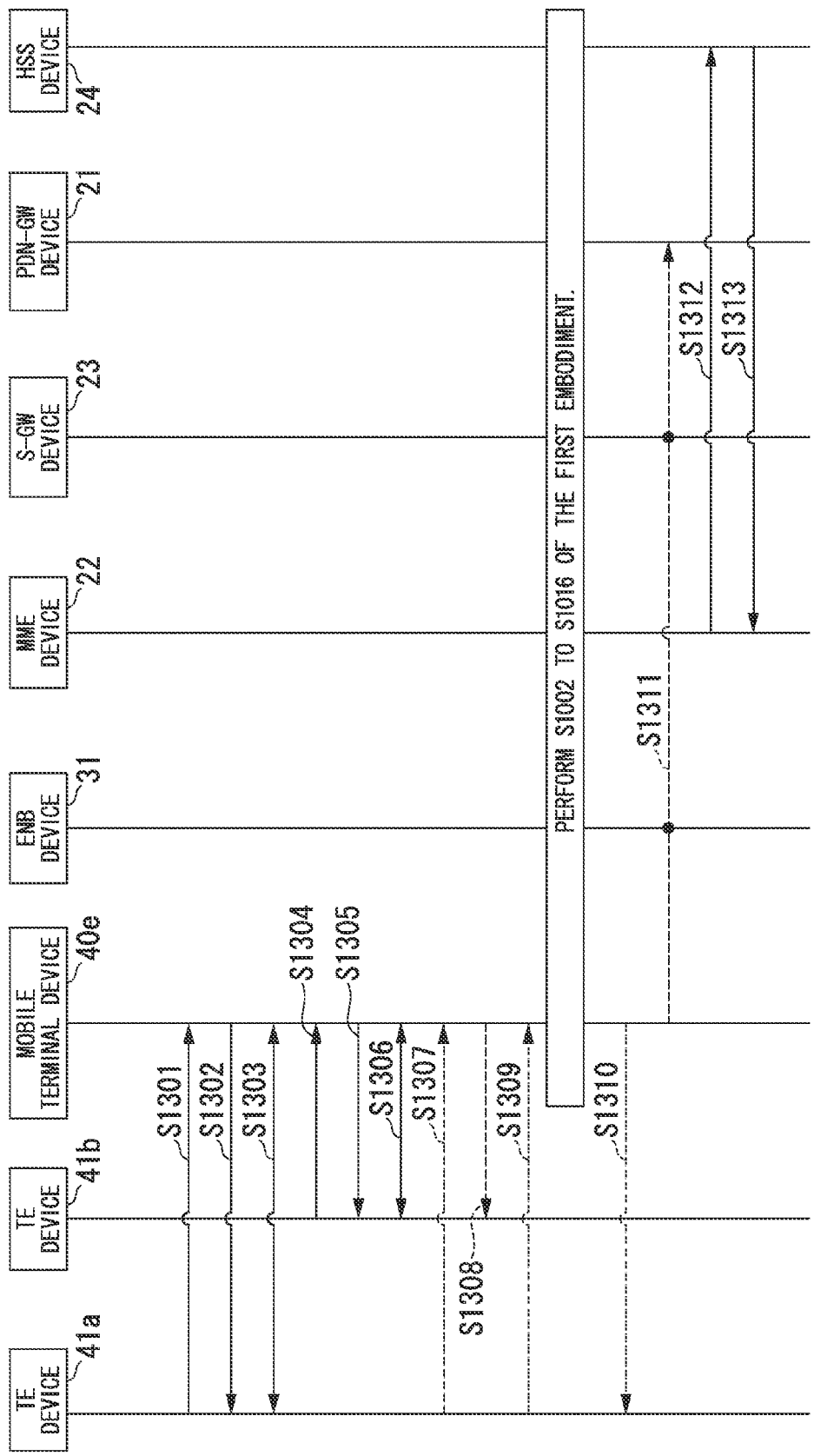

MOBILE COMMUNICATION SYSTEM

CROSS-REFERENCE TO RELATED APPLICATIONS

This application is a Continuation of copending application Ser. No. 13/259,071, filed on Sep. 22, 2011, which is the National Phase of PCT International Application No. PCT/JP2010/002185, filed on Mar. 26, 2010, which claims the benefit under 35 U.S.C. §119(a) to Patent Application No. 2009-079962, filed in Japan on Mar. 27, 2009, all of which are hereby expressly incorporated by reference into the present application.

TECHNICAL FIELD

The present invention relates to a mobile communication system, and particularly to a mobile communication system connected to an external packet data network.

BACKGROUND ART

In the UMTS (Universal Mobile Telecommunications System) that has been standardized as a third-generation mobile communication system, an MT (Mobile Terminal) is established as a mobile terminal that has a UMTS wireless interface and a TE (Terminal Equipment) is established as a terminal equipment that connects to the MT. The MT and TE are collectively called UE (User Equipment).

A TE-MT interface is set forth in the Non-Patent Document 1 (TS 27.060), wherein a communication protocol is indicated in which a TE such as a laptop PC (personal computer) that does not have a UMTS wireless interface connects to a PDN (Packet Data Network) that is an external network, via the UMTS wireless interface in an MT. Although the physical interface between the TE and MT can use not only a wired interface such as a serial cable or a USB (Universal Serial Bus) cable, but also can use a wireless interface such as Bluetooth (registered trademark) or the like, the use of the PPP (Point-to-Point Protocol) is called for.

Patent Document 1 discloses a method whereby, rather than a TE-MT interface, an Ethernet (registered trademark) and DHCP (Dynamic Host Configuration Protocol) are used to allocate an IP (Internet Protocol) address to the TE and make connection to the PDN. Additionally, it is assumed that it will be possible to use this TE-MT interface in the EPS (Evolved Packet System), which is standardized as the next-generation mobile communication system by the 3GPP (3rd Generation Partnership Project).

The protocol for connecting a UE to the PDN in an EPS is set forth in the Non-Patent Document 2 (TS 23.401). The UE, after first being attached to the wireless access network, establishes a logical path connection to the PDN, which is known as a PDN connection.

The PDN is uniquely identified by the APN (Access Point Name), and is connected to the core network via a PDN-GW, which is an external gateway equipment. The PDN connection is established individually for each PDN-GW that is connected to the UE. Even via one and the same PDN-GW, when connections are made to different PDNs, independent PDN connections are required.

One PDN connection combines a plurality of logical paths that is known as an EPS bearer when transferring a user IP packet, and it is further possible to assign a QoS (Quality of Service) class and a charging rule or the like to each EPS bearer. Therefore, using the UE packet transmission destination and transport protocol, it is possible to apply different QoS classes and charging rules to each IP packet, using a port number.

Patent Document 1: Japanese Unexamined Patent Application Publication (Translation of PCT Application) No. 2008-511222

Non-Patent Document 1: TS 27.060 Packet Domain; Mobile Station (MS) Supporting Packet Switched Services Non-Patent Document 2: TS 23.401 General Packet Radio Service (GPRS) Enhancements for Evolved Universal Terrestrial Radio Access Network (E-UTRAN) Access

DISCLOSURE OF INVENTION

Problem to be Solved by the Invention

However, when a user is walking around carrying a plurality of TEs such as a PDA or a laptop personal computer that does not have a wireless interface for direct connection to an EPS and a mobile terminal device that alone can connect to an EPS as a UE, an ad-hoc network being formed that locally makes connection between these devices, and the TE being connected to the ad-hoc network uses the mobile terminal device as an MT to make connection to the PDN, there is a problem that the processing load increases as noted below, and there is a limitation on the service that can be provided.

Conventionally, PDN connections have been established for each TE. Therefore, even in the case in which a plurality of TEs are connected to one and the same PDN and also to one and the same PDN-GW, as many procedures for establishing PDN connections are necessary as there are TEs. The mobile terminal device itself to which the TE is connected is also connected to the EPS and establishes a PDN connection for the mobile terminal device in order to benefit from the communication service. However, with regard to any of these PDN connections, even though they are established from a common mobile terminal device as the point of origin, because they could not be combined, there was the problem of an increase in the processing load, because of the increase in the overall system administrative information. Additionally, at the time of handover as well, it is necessary to perform the protocol for re-establishing the PDN connections for all PDN connections, thereby causing an increase in the overall system processing load.

A method that can be envisioned so that the number of PDN connections does not increase is that of providing an NAT (Network Address Translator) in the above-noted mobile terminal device, and sharing one IP address allocated to the mobile terminal device and one PDN connection between the mobile terminal device and a plurality of TEs. In this case, however, not only does the installation into the mobile terminal device becomes complex, but also processing for the mobile terminal device to check all the packets transmitted and received by the TE becomes necessary and, if necessary, to rewrite the packet header and payload, thereby increasing the processing load on the mobile terminal device. This results in the problems of a reduced throughput and an increase in battery consumption of the mobile terminal device. Additionally, because a packet transmitted by the mobile terminal device itself and a packet that the TE transmits cannot be distinguished when seen from the viewpoint of the core network, the limitation occurs that, in spite of the fact that it is the origin of a packet transmission, the same QoS class and charging rule must be applied, this leading to the problem of hindering the implementation of a diverse service model in which different charging models are applied, depending upon the mode of use.

The present invention was made in consideration of the above-described situation and has as an object the provision of a mobile communication system capable of suppressing an increase in the processing load and a limitation of providable services, even in the case in which an ad-hoc network is formed between a mobile terminal device and a plurality of TEs and a PDN connection is made by the TE using the mobile terminal device as an MT.

Means for Solving the Problem (1) In an aspect of the present invention, there is provided a mobile communication system including a mobile terminal device performing a communication connection with a plurality of information terminal devices, a wireless access network performing wireless communication with the mobile terminal device, and a core network performing communication with an external packet data network, and also performing communication with the mobile terminal device via the wireless access network, wherein: the core network includes a PDN connection holding unit that associates and stores information regarding PDN connection that is a logical path used for transfer of user data via the wireless access network between the external packet data network and the mobile terminal device with information indicating an address block configured as a set of a plurality of addresses identifying a plurality of the information terminal devices.

(2) In the aspect of the present invention, the mobile terminal device may include: a connection request unit that requests the core network to set an information terminal PDN connection that is a PDN connection to be used for transfer of user data of the information terminal devices and that receives from the core network information indicating the address block assigned to the information terminal PDN connection set by the request; an address allocation unit that allocates an address belonging to an address block indicated by information received by the connection request unit to the information terminal devices; a router function unit that, when user data addressed to an address allocated to the information terminal devices is received, transfers the received user data to the information terminal devices to which the address is allocated; wherein the core network may include a PDN connection setting unit that, when a request is received from the mobile terminal device, allocates the address block to the PDN connection for the information terminal and associates and stores in the PDN connection holding unit information indicating the address block with information regarding the PDN connection for the information terminal, and transmits information indicating the allocated address block to the mobile terminal device.

(3) In the aspect of the present invention, the connection request unit of the mobile terminal device, when requesting the setting of the information terminal PDN connection, may specify an address block class that is a type of the address block allocated the information terminal PDN connection and that specifies one of an address block indicated by the IPv4 network address, an address block indicated by the IPv6 prefix, or an address block indicated by the IPv4 network address and by the IPv6 prefix, and wherein the PDN connection setting unit of the core network, when setting the information terminal PDN connection, may allocate to the set information terminal PDN connection the type of address block specified by the address block class.

(4) In the aspect of the present invention, the connection request unit of the mobile terminal device, when requesting the core network to set a PDN connection for a mobile terminal that is a logic path used for transfer of user data of the mobile terminal device with an external network, via the wireless access network, may include in the request a request for setting of the information terminal PDN connection.

(5) In the aspect of the present invention, the connection request unit of the mobile terminal device, when requesting the core network to set a PDN connection for a mobile terminal that is a logic path used for transfer of user data of the mobile terminal device between an external network and thereof, via the wireless access network, may include in the request a flag indicating that the mobile terminal device includes the router function unit, and wherein, the core network may include a setting enabled/disabled unit that, when a request to set the information terminal PDN connection is received, judges, based on the flag, whether the information terminal PDN connection can bet set.

(6) In the aspect of the present invention, the mobile terminal device may include an address block storage unit that stores information indicating the address block, and wherein the address allocation unit of the mobile terminal device, when the information terminal devices performs communication connection with the mobile terminal device, may allocate to the information terminal device an address that belongs to the address block stored by the address block storage unit.

(7) In the aspect of the present invention, the core network may include a terminal information storage unit that stores information indicating an address block allocated to the information terminal PDN connection in association with information that identifies the mobile terminal device, wherein the PDN connection setting unit of the core network, upon receiving a request for an information terminal PDN connection setting, may allocate the address block stored by the terminal information storage unit, in association with information identifying the mobile terminal device that originated the request.

(8) In the aspect of the present invention, the core network may include a terminal information storage unit that stores information indicating whether a user of a mobile terminal device is subscribed to a network mobile service, in association with information identifying the mobile terminal device, wherein the setting enabled/disabled judgment unit of the core network, upon receiving a request for setting of an information terminal PDN connection, may determine whether an information terminal PDN connection can be set, based on the flag in the request, and on information stored by the terminal information storage unit.

(9) In the aspect of the present invention, the core network may include a terminal information storage unit that stores information indicating whether or not a user of the mobile terminal is subscribed to a network mobile service, in association with information identifying the mobile terminal device, wherein the setting enabled/disabled judgment unit of the core network, upon receiving a request for setting of a mobile terminal PDN connection, may determine whether a mobile terminal PDN connection can be set, based on the flag in the request, and on information stored by the terminal information storage unit.

(10) In the aspect of the present invention, the mobile terminal device may include a dynamic host setting client unit that, using a dynamic host setting protocol, requests an address block from the core network, and receive from the core network information indicating the address block allocated to the information terminal PDN connection by the request, wherein the core network may include a dynamic host setting server unit that, upon receiving the request for the address block using the dynamic host setting protocol, allocate an address block to the information terminal PDN connection of the mobile terminal device that originated the request, and transmit the address block to the mobile terminal device.

(11) In the aspect of the present invention, the mobile terminal device may include: a connection request unit that requests the core network to set an information terminal PDN connection that is a logical path used for transfer of user data of the information terminal device with the external PDN, and receives as a response to the request information indicating an address allocated to the information terminal PDN connection set by the request; an address allocation unit that allocates an address received by the connection request unit to the information terminal device; and a router function unit that, upon receiving user data addressed to the address allocated to the information terminal device, transfers the received user data to the information terminal to which the address had been allocated, wherein the core network, upon receiving a request from the mobile terminal device, may associate an address belonging to the address block allocated to the mobile terminal PDN connection used in transfer of user data of the mobile terminal device with information regarding the information terminal PDN connection for which setting was requested, store these in the PDN connection holding unit, and transmit the allocated address to the mobile terminal device.

Effect of the Invention

According to the present invention, PDN connections for a plurality of terminal devices connected to a common mobile terminal device can be combined, and additionally the establishment of the PDN connection for the mobile terminal device and the establishment of the PDN connection for the mobile terminal device can be performed together, thereby enabling suppression of an increase in processing load and limitation of the providable service.

BRIEF DESCRIPTION OF THE DRAWINGS

FIG. 22 is a diagram showing an example of the sequence for establishing a TE PDN 21 connection in the same embodiment.

BEST MODE FOR CARRYING OUT THE INVENTION

First Embodiment

Figure 1:
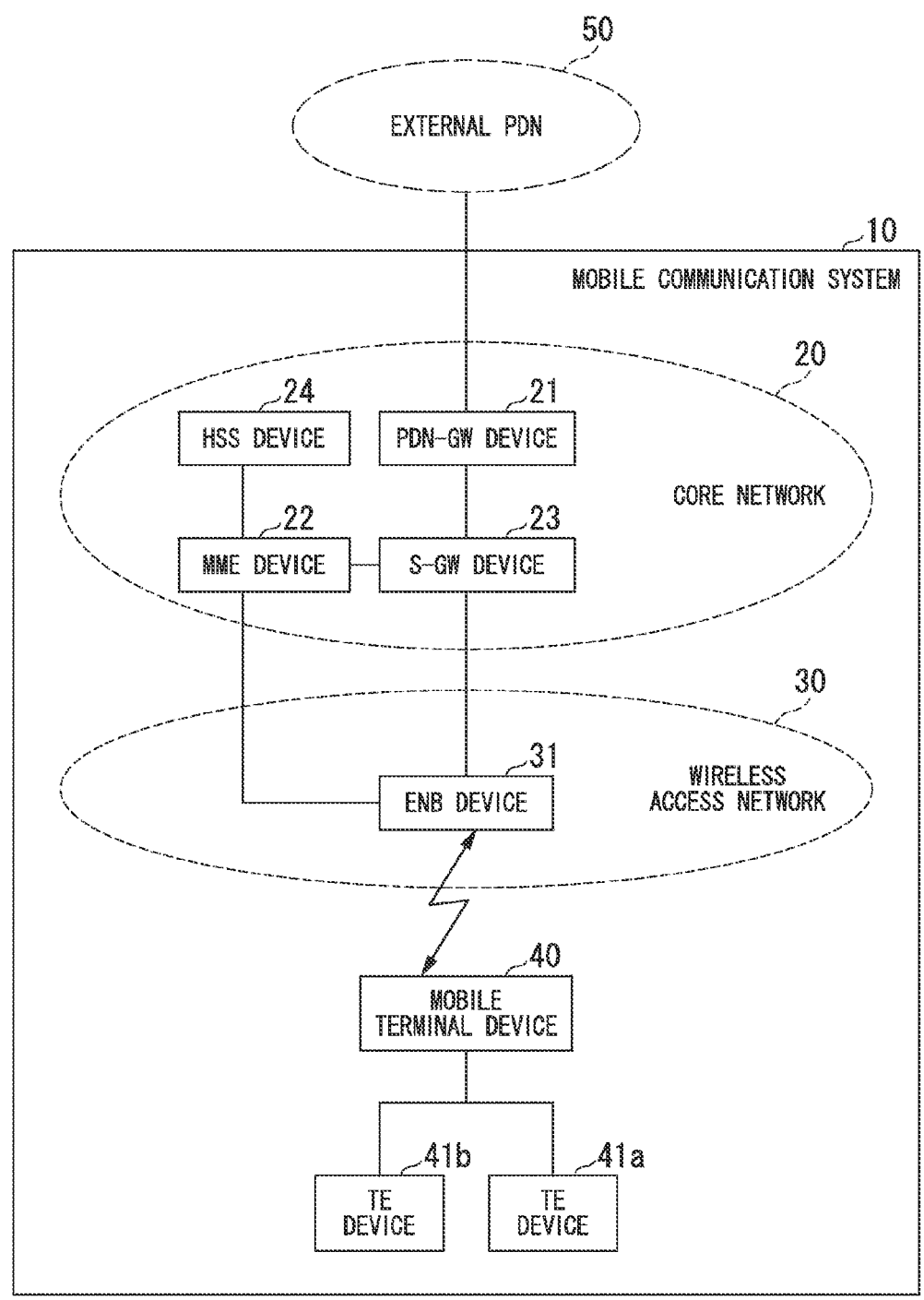
FIG. 1 is a simplified block diagram showing the network configuration of a mobile communication system according to a first embodiment of the present invention.

The first embodiment of the present invention is described below, with references made to drawings. FIG. 1 is a simplified block diagram showing the network configuration of a mobile communication system according to the first embodiment of the present invention. The mobile communication system 10 in this embodiment is connected to an external PDN (Packet Data Network) 50, and has a core network 20, a wireless access network 30, and at least one mobile terminal device 40. In the example shown in FIG. 1, the communication system device 10 has TE devices 41a and 41b that are connected to the mobile terminal device 40. Although this embodiment is described for the example of an EPS as the mobile communication system that is standardized by 3GPP, the present invention is not limited in this manner, and can be applied in the same manner to a mobile communication system that has a node configuration.

The core network 20 has a PDN-GW device 21, an MME (Mobile Management Entity) device 22, an S-GW device 23, and an HSS (Home Subscriber Server) device 24. The S-GW device 23 transmits and receives, as a local mobility anchor, packets from the ENB (eNodeB: base station device) 31 to which the mobile terminal device 40 is connected.

The PDN-GW device 21 is connected to the external PDN 50, which is the Internet or an IMS (IP Multimeda Subsystem), and functions as a gateway that connects the core network 20 to these types of external PDNs 50. The PDN-GW device 21 allocates an IP address and performs sorting by packet QoS. The PDN-GW device 21 and the S-GW device 23 may be constituted on one and the same physical node.

The MME (Mobility Management Entity) 22 is an entity that performs only signaling, and has as its main function management, including paging of mobility of the mobile terminal device 40 that connects to the wireless access network 30.

The HSS device 24 performs user authentication and manages subscription data. Subscription data includes a subscriber's service subscription information, and whether the subscriber is subscribed to NEMO (Network Mobility) service. The wireless access network 30 has at least one ENB device 31, which is a base station.

The mobile terminal device 40 is a device that has the functions of both an MT and a UE in UMTS. The TE devices 41a and 41b are TEs in UMTS.

GTP (General Packet Radio Service Tunneling Protocol) or GRE (Generic Routing Encapsulation) is used as the packet tunneling protocol between the S-GW device 23 and the PDN-GW device 21. With GTP, exchange is performed of the TEIDs (Tunnel Endpoint IDs) between two nodes and two TEIDs are set individually for each direction. Because different TEIDs are allocated for each EPS bearer, the GTP endpoint node (S-GW device 23 or PDN-GW device 21) references the TEID included in the packet header to be able to uniquely distinguish between the mobile terminal device 40 and its EPS bearer. Similar to GTP, GRE performs exchange of GRE keys, which correspond to the TEIDs in GTP, between two nodes, and sets two GRE keys (downlink GRE key and uplink GRE key) individually for each direction.

Figure 2:
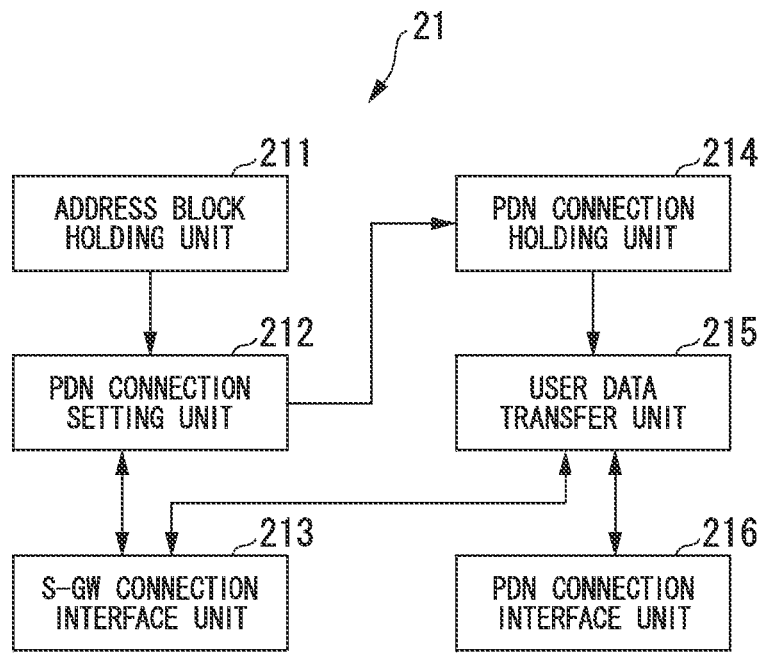
FIG. 2 is a simplified block diagram showing the configuration of a PDN-GW device 21 in the same embodiment.

FIG. 2 is a simplified block diagram showing the configuration of the PDN-GW 21 in the present embodiment. The PDN-GW 21 has an address block holding unit 211, a PDN connection setting unit 212, an S-GW connection interface unit 213, a PDN connection holding unit 214, a user data transfer unit 215, and a PDN connection interface unit 216.

The S-GW connection interface unit 213 is a communication interface unit for performing communication connection with the S-GW device 23. Each unit of the PDW-GW device 21 performs communication with the S-GW device 23, via this S-GW connection interface unit 213. The PDN connection interface unit 216 is a communication interface unit for performing communication with the external PDN 50. Each unit of the PDN-GW device 21 performs communication with the external PDN 50, via this PDN connection interface unit 216.

The address block holding unit 211 holds information indicating an address block that can be allocated to the PDN connection by the PDN connection setting unit 212, which is described later. An address block as used herein is a set of a plurality of addresses, and in the present embodiment is a network address in IPv4 (for example, 192.63.25.0/24 of 192.63.25.0 to 192.63.25.255) and an IPv6 prefix in IPv6 (for example, 1392:d38c::/32 of 1392:d38c:: to 1392:d38c:ffff:ffff::).

The PDN connection holding unit 214 stores information regarding a PDN connection, associating it with information that indicates an address block. The PDN connection in this case is a logical path used for transfer of user data, via the wireless access network 30, between the external PDN 50 and the mobile terminal device 40. There are two types of PDN connections, a PDN connection for UE (PDN connection for a mobile terminal) for transferring user data of the mobile terminal device 40, and a PDN connection for a TE (PDN connection for an information terminal) for transferring user data of the information terminals 41a and 41b.

The PDN connection setting unit 212, upon receiving a request from the mobile terminal device 40, allocates an address block to a TE PDN connection or a UE PDN connection, associates information that indicates the address block with information that indicates the TE PDN connection or the UE PDN connection and causes the PDN connection holding unit 214 to store the information, and transmits information indicating the allocated address block, addressing it to the mobile terminal device 40.

The user data transfer unit 215, upon receiving user data from the external PDN 50, accesses the PDN connection holding unit 214, acquires PDN connection information associated with the address block included in the addressee of the received user data, and uses the PDN connection of the acquired information to transfer the received user data to the mobile terminal device 40. The user data transfer unit 215, upon receiving user data from the mobile terminal device 40, via the S-GW device 23, transfers it to the external PDN 50. In the present embodiment, the user data from the mobile terminal device 40 includes user data of the mobile terminal device 40, and user data of the information terminal devices 41a and 41b connected to the mobile terminal device 40.

Figure 3:
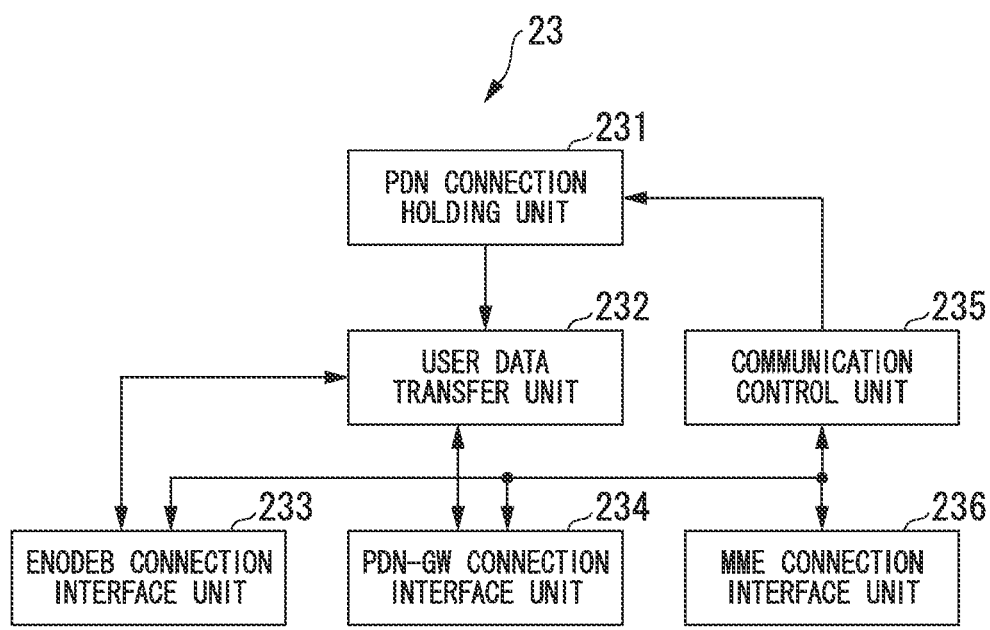
FIG. 3 is a simplified block diagram showing the configuration of an S-GW device 23 in the same embodiment.

FIG. 3 is a simplified block diagram showing the configuration of the S-GW device 23 in the present embodiment. The S-GW device 23 has a PDN connection holding unit 231, a user data transfer unit 232, an ENODEB connection interface unit 233, a PDN-GW connection interface unit 234, a communication control unit 235, and an MME connection interface unit 236.

The ENODEB connection interface unit 233 is a communication interface unit for performing communication connection to the ENB device 31. Each unit of the S-GW device 23 performs communication with the ENB device 31, via the ENODEB connection interface unit 233. The PDN-GW connection interface unit 234 is a communication interface unit for performing communication connection with the PDN-GW device 21. Each unit of the S-GW device 23 performs communication with the PDN-GW device 21, via the PDN-GW connection interface unit 234. The MME connection interface unit 236 is a communication interface unit for performing communication connection with the MME device 22. Each unit of the S-GW device 23 performs communication with the MME device 22, via the MME connection interface unit 236.

The PDN connection holding unit 231 stores information regarding the PDN connection. The user data transfer unit 232, upon receiving user information from the mobile terminal device 40, via the END device 31, transfers it to the PDN-GW device 21, using the PDN connection that is stored by the PDN connection holding unit 231. The user data transfer unit 232, upon receiving the user data from the external PDN 50 via the PDN-GW device 21, transfers it to the ENB device 31, using the PDN connection that is stored in the PDN connection holding unit 231.

Figure 4:
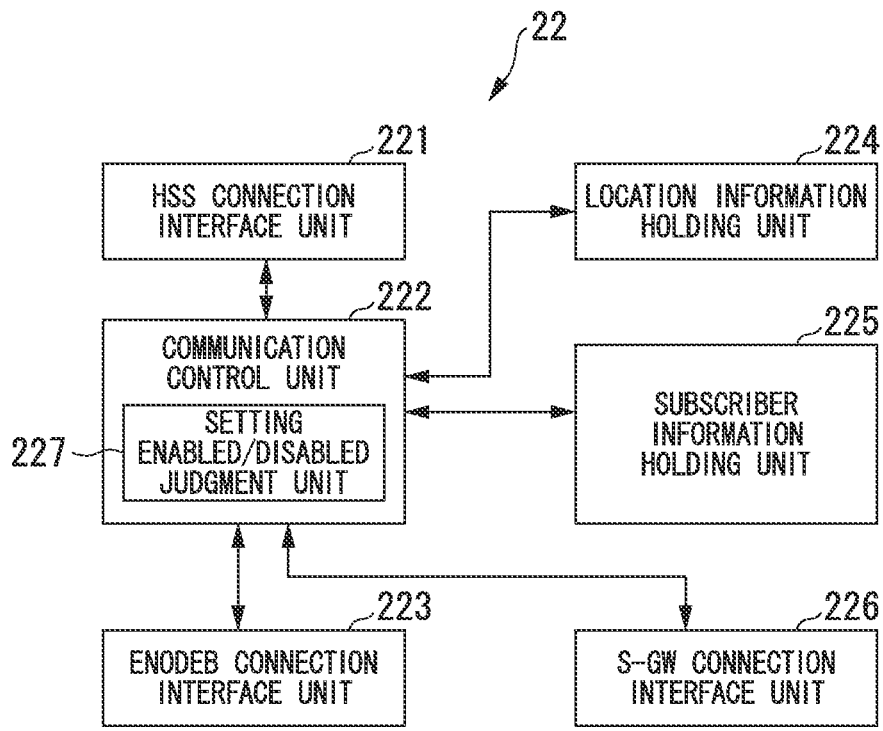
FIG. 4 is a simplified block diagram showing the configuration of an MME device 22 in the same embodiment.

FIG. 4 is a simplified block diagram showing the configuration of the MME device 22 in the present embodiment. The MME device 22 has an HSS connection interface unit 221, a communication control unit 222, an ENODEB connection interface 223, a location information holding unit 224, a subscriber information holding unit 225, and an S-GW connection interface unit 226. The HSS connection interface unit 221 is a communication interface unit for performing communication connection with the HSS device 24. Each unit of the MME device 22 performs communication with the HSS 24, via the HSS connection interface unit 221.

The ENODEB connection interface unit 223 is a communication interface unit for performing communication connection with the ENB device 31. Each unit of the MME device 22 performs communication with the ENB device 31, via the ENODEB connection interface 223. The S-GW connection interface unit 226 is a communication interface unit for performing communication connection with the S-GW device 23. Each unit of the MME device 22 performs communication with the S-GW device 23, via the S-GW connection interface unit 226.

The location information holding unit 224 holds location information that indicates what ENB device 31 it is possible for each mobile terminal device 40 to communication with. The subscriber information holding unit 225 (terminal information storage unit) holds subscription data that includes service subscription information indicating which of mobile terminal devices 40 are subscribed to which service, associated with information identifying each of the mobile terminal devices 40. In the present embodiment, this service includes NEMO (Network Mobility) service. Also, in the present embodiment, the subscription data includes a flag that indicates whether or not the mobile terminal device 40 has a router function. The location information and subscription data is the required data acquired by the MME device 22 from the HSS device 24.

The communication control unit 222 controls communication of the MME device 22, and has a setting enabled/disabled judgment unit 227. The setting enabled/disabled judgment unit 227, upon receiving an attach request from the mobile terminal device 40 (request for a UE PDN connection setting), via the ENB device 31, makes a judgment as to whether the UE PDN connection that has been requested for setting can be set, based on a flag that indicates whether or not there is a router function being requested, and information included in the subscription data of the mobile terminal device 40 that indicates whether or not the mobile terminal device that originates the request is subscribed to the NEMO service. Details of this judgment are described later. The communication control unit 222 causes the subscriber information holding unit 225 to store the value of the flag that indicates whether or not a router function is provided.

The setting enabled/disabled judgment unit 227, upon receiving a TE PDN connection setting request, via the ENB device 31, makes the judgment of whether setting is possible of the requested TE PDN connection, based on a flag, stored by the subscriber information holding unit 225, that indicates whether or not the mobile terminal device 40 has a router function. If the value of the flag indicates that the router function is provided, the judgment is settable, but if it indicates that the router function is not provided, the judgment is not settable.

Figure 5:
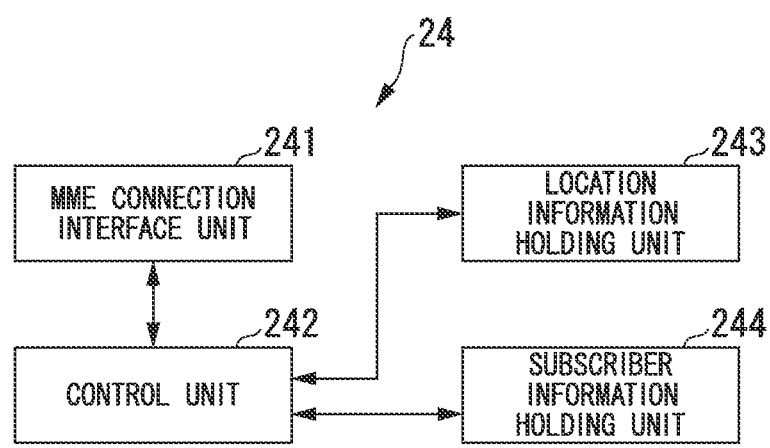
FIG. 5 is a simplified block diagram showing the configuration of an HSS device 24 in the same embodiment.

FIG. 5 is a simplified block diagram showing the configuration of the HSS device 24 in the present embodiment. The HSS device 24 has an MME connection interface unit 241, a control unit 242, a location information holding unit 243, and a subscriber information holding unit 244. The MME connection interface unit 241 is a communication interface unit for performing communication connection with the MME device 22. Each unit of the HSS device 24 performs communication with the MME device 22, via the MME connection interface unit 241.

The location information holding unit 243 holds location information of all the mobile terminal devices 40 that belong to the mobile communication system.

The subscriber information holding unit 244 holds subscription data for all mobile terminal devices 40 that belong to the mobile communication system 10. The control unit 242 controls the overall HSS device 24. The control unit 242 also, in response to a request from the MME device 22, provides and updates location information held by the location information holding unit 243 and the subscription data held by the subscriber information holding unit 244.

Figure 6:
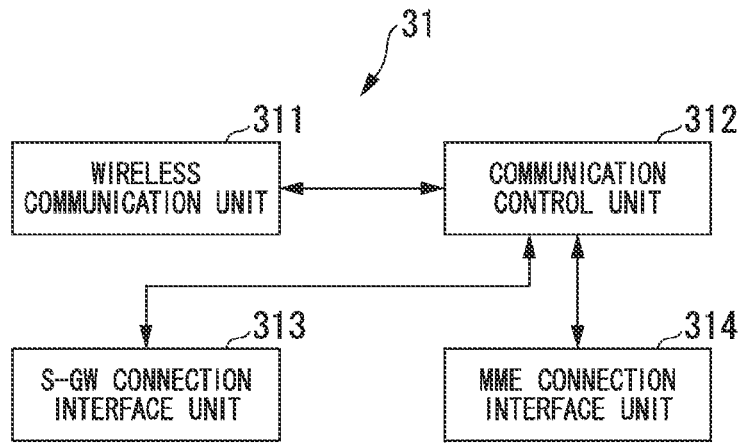
FIG. 6 is a simplified block diagram showing the configuration of an ENB device 31 in the same embodiment.

FIG. 6 is a simplified block diagram showing the configuration of the ENB device 31 in the present embodiment. The ENB device 31 has a wireless communication unit 311, a communication control unit 312, an S-GW connection interface unit 313, and an MME connection interface unit 314. The wireless communication unit 311 is a communication interface unit for performing communication connection with the mobile terminal device 40. Each unit of the ENB device 31 performs communication with the mobile terminal device 40, via the wireless communication unit 311.

The communication control unit 312 controls communication in the ENB device 31. The S-GW connection interface unit 313 is a communication interface unit for performing communication connection with the S-GW device 23. Each unit of the ENB device 31 performs communication with the S-GW device 23, via the S-GW connection interface unit 313. The MME connection interface unit 314 is a communication interface unit for performing communication connection with the MME device 22. Each unit of the ENB device 31 performs communication with the MME device 22, via the MME connection interface unit 314.

Figure 7:
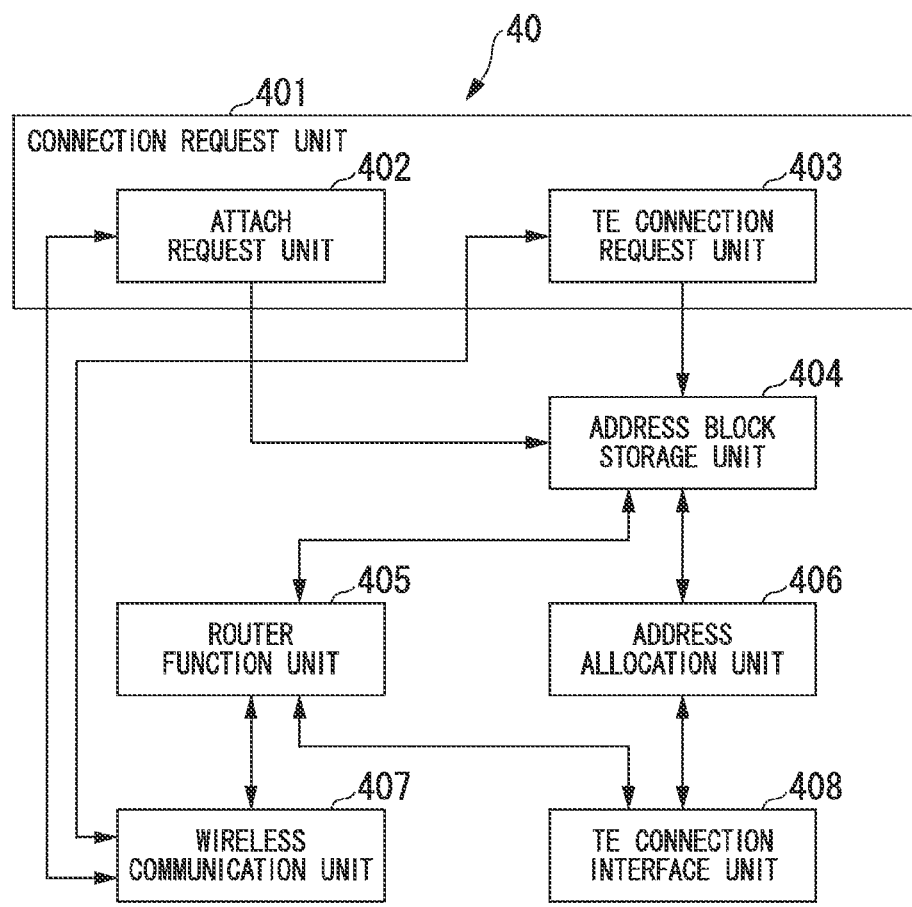
FIG. 7 is a simplified block diagram showing the configuration of a mobile terminal device 40 in the same embodiment.

FIG. 7 is a simplified block diagram that shows the constitution of the mobile terminal device 40. The mobile terminal device 40 has a connection request unit 401, an address block storage unit 404, a router function unit 405, an address allocation unit 406, a wireless communication unit 407, and a TE connection wireless communication unit 408. The connection request unit 401 has an attach request unit 402 and a TE connection request unit 403. The wireless communication unit 407 is a communication interface for performing a communication connection with the ENB device 31. Each unit of the mobile terminal device 40 performs wireless communication with the ENB device 31, via this wireless communication unit 407. The TE connection wireless communication unit 408 is a communication interface for performing a communication connection with the TE devices 41a and 41b. Each unit of the mobile terminal device 40 performs communication with the TE devices 41a and 41b, via this wireless communication unit 408.

The attach request unit 402 makes an attach request (UE PDN connection setting) to the core network 20, via the ENB device 31, and receives information that indicates the IP address (IPv4 address or IPv6 prefix) that is allocated to the UE PDN connection set by the request from the core network 20, via the ENB device 31. This request includes a flag that indicates that the mobile terminal device 40 has a router function (router function unit 405). The description of the subsequent communication that is performed between the mobile terminal device and the core network, via the ENB device 31, is omitted herein.

The TE connection request unit 403 makes a TE PDN connection setting request to the core network 20, via the ENB device 31, and receives information that indicates the IP address (IPv4 network address or IPv6 prefix) that is allocated to the TE PDN connection set by the request from the core network 20, via the ENB device 31.

The address block storage unit 404 stores information that indicates the address blocks received by the attach request unit 402 and the TE connection request unit 403 of the connection request unit 401. The address allocation unit 406 allocates an address that belongs to the address block indicated by the information received by the TE connection request unit 403 to the TE device 41a.

The router function unit 405, upon receiving the user data addressed to the address allocated to the TE devices 41a and 41b, transfers the received user data to the TE device to which the address is allocated.

Figure 8:
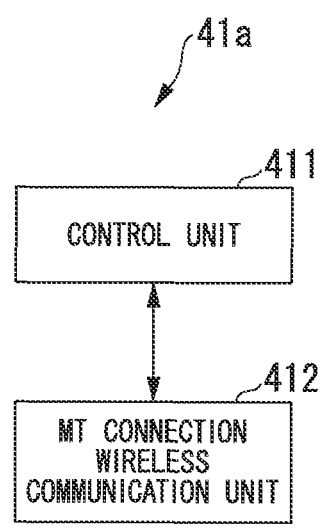
FIG. 8 is a simplified block diagram showing the configuration of a TE device 41a in the same embodiment.

FIG. 8 is a simplified block diagram showing the configuration of the TE device 41a in the present embodiment. Because the TE devices 41a and 41b have the same configuration, the description will be of the configuration of the representative TE device 41a. The TE device 41a has a control unit 411 and an MT connection wireless communication unit 412. The control unit 411 controls the overall TE device 41a. The MT connection wireless communication unit 412 is a communication interface unit for performing communication connection with a mobile terminal device 40 that has an MT function (modem function for making connection to the wireless access network 30). The control unit 411 performs communication with the mobile terminal device 40, via the MT connection wireless communication unit 412.

Figure 9:
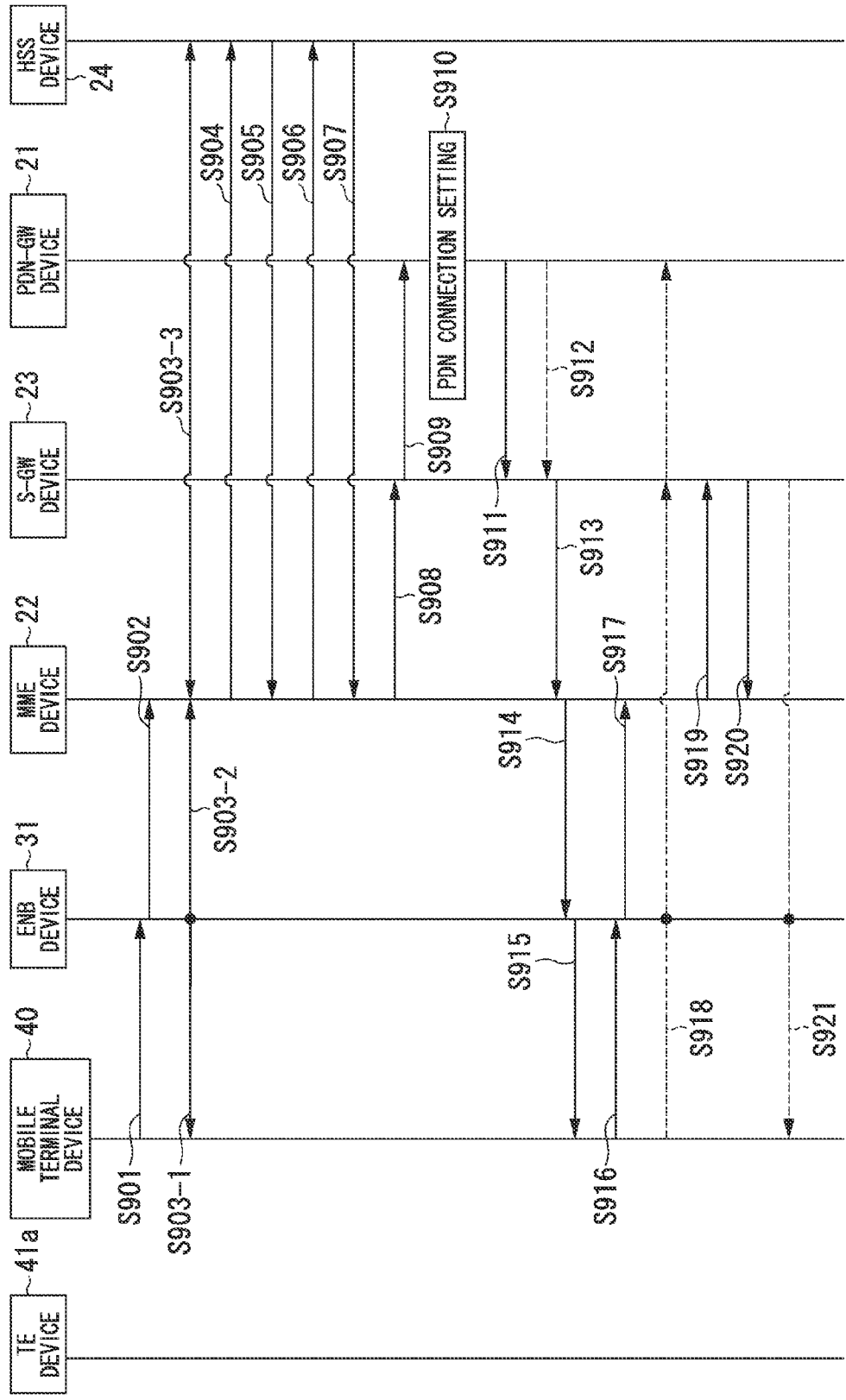
FIG. 9 is a sequence diagram showing an example of the sequence of attaching the mobile terminal device 40 to an EPS in the same embodiment.

The mobile terminal device 40, by first performing attachment to the EPS, establishes its own PDN connection and default EPS bearer as a UE. FIG. 9 is a sequence diagram showing an example of the sequence of the mobile terminal device 40 attaching to the EPS. First, the attach request unit 402 of the mobile terminal device 40 transmits an attach request to the ENB device 31 (S901). This attach request includes therein subscriber identification information (IMSI: International Mobile Subscriber Identify) and user equipment function information (UE capability) that indicates the functions that the UE has. The user equipment function information includes an MR function capability (MR capability) flag that indicates the existence or non-existence of the MR (Mobile Router) function. In the case in which the mobile terminal device 40 functions as an MR (Mobile Router) and the MT of another plurality of TEs, the mobile terminal device 40 sends the attach request with this flag set to valid.

The ENB device 31 receives the above-noted attach request and transmits it to the MME device 22 (S902). The MME device 22 extracts the subscriber identification information included in the attach request and performs user authentication between the mobile terminal device 40 and the HSS device 24 (S903-1 to S903-3). If the user authentication succeeds, in order to acquire the service subscription status of the subscriber, the MME device 22 transmits to the HSS device 24 the location information update message that includes the subscriber identification information included in the attach request at sequence S902 (S904). Upon receiving the location information update message, the HSS device 24 transmits subscription data that indicates the specified contract information of the subscriber to the MME device 22 (S905).

The MME device 22 verifies from the acquired subscription data whether the subscriber has contracted for the NEMO service and, in the case in which, in spite of not being subscribed to the NEMO service, the MR function is requested, an attach refusal is transmitted to the mobile terminal device 40, via the ENB device 31, and the attach sequence is interrupted (attach failure). Further, if necessary, a notification is given to the user by the mobile terminal device 40 to the effect that there is no subscription to the NEMO service.

In the case in which, in spite of not being subscribed to the NEMO service the MR function is requested, rather than the MME device 22 sending the attach refusal and interrupting the attach sequence, the mobile terminal device PDN connection establishment processing noted below as steps S906 and thereafter may be continuously performed, and at least communication performed by the mobile terminal device 40 may be permitted, regardless of whether or not there is a subscription to the NEMO service. In this case, however, the MME device 22, upon receiving the PDN connectivity request at step S1003 of FIG. 10 to be described later, at the stage of starting the TE PDN connection establishment protocol, based on either the subscription data acquired at the above-described step S905 or the subscription data acquired once again from the HSS device 24, a judgment is made as to whether or not the user has contracted for the NEMO service and, if the judgment is that subscription has not been made to the NEMO service, a PDN connection refusal is returned in the mobile terminal device 40, and the TE PDN connection is not established, without transmitting the Bearer Setup Request of step S1004.

As a result of checking the subscription data acquired at sequence S905, if the subscriber has contracted for NEMO service, the MME device 22 transmits the subscription data ACK (Insert Subscriber Data Ack) to the HSS device 24 (S906). The HSS device 24 completes the updating of the location information of the mobile terminal device 40 in response to a location information update message at sequence 904, and transmits a location information update ACK (Update Location Ack) to the MME device 22.

Next, the MME device 22, in order to establish a default EPS bearer between the S-GE device 23 and the PDN-GW device 21, transmits a Bearer Setup Request to the S-GW device 23. The Bearer Setup Request includes the subscriber's identification information, the IP address of the PDN-GW device 21, the APN, the PDN connection ID1, the PDN type 1, the PDN address 1, and the EPS bearer ID1.

The APN (Access Point Name) uniquely defines the external PDN 50 to be connected, and the IP address of the PDN-GW device 21 and the APN are determined based on the subscription data acquired from the HSS device 24, and with regard to the APN, the mobile terminal device 40 may be explicitly indicated by including it in the attach request transmitted at S901. The PDN connection ID is an identifier for the purpose of distinguishing among a plurality of PDN connections that are established to one and the same PDN-GW device 21 within one and the same PDN, at least within the PDN-GW device 21. It is sufficient that the PDN connection ID distinguishes among a plurality of PDN connections that are established from the mobile terminal device 40 to one and the same PDN-GW device 21 within one and the same PDN, and rather than this being an independent information element, by making this a new identifier that is appended, for example, to the end of one APN, it may identify the individual PDN connections of a plurality of PDN connections established with a mobile terminal device 40 within a PSN-GW device 21.

The PDN address indicates the IPv4 address or the IPv6 prefix, or both, allocated to the PDN connection that is established. In the case in which the address allocation is left up to the PDN-GW device 21, the NULL address (address not specified) is stored, and in the case in which there is specification within the above-noted subscription data, that address may be used. The PDN type indicates the IP address type of the PDN address, and it is possible to specify an IPv4 address or an IPv6 prefix, or both. The EPS bearer ID is an identifier that distinguishes among a plurality of EPS bearers established by one mobile terminal device 40.

The S-GW device 23 receives the Bearer Setup Request and starts the protocol to establish an EPS bearer with the PDN-GW device 23. In the case in which GTP is used as the protocol to implement the EPS bearer, the S-GW device 23 transmits a Bearer Setup Request to the PDN-GW device 21 (S909). The Bearer Setup Request includes the subscriber's identification information, the S-GW device 23 IP address, the APN, the PDN connection ID1, the TEID1 for the S-GW, the PDN type 1, the PDN address 1, and the EPS bearer ID1.

In the case in which GRE is used as the protocol to implement the EPS bearer, the S-GW device 23 transmits a Proxy Binding Update message to the PDN-GW device 21 (S909). The Proxy Binding Update includes the mobile network access identifier (MN_NA1: Mobile Node Network Access Identifier) generated from the identification information, the APN, the PDN connection ID1, the downlink GRE key 1, the PDN type 1, and the PDN address 1.

The PDN-GW device 21, upon receiving the Bearer Setup Request or the Proxy Binding Update at sequence S909, sets the PDN connection 1 (S910). In the setting of the PDN connection, the PDN-GW device 21 first, in the case in which a specific ID address has not been set in the PDN address 1 received at sequence S909, allocates an IPv4 address 1, an IPv6 prefix, or both to the PDN address 1. This PDN address is then allocated to the PDN connection 1. Additionally, a default EPS bearer that is associated with the PDN connection 1 is established, and a user packet addressed and transferred to this PDN address 1 is linked to the above-noted EPS bearer that has been established.

Then, the PDN-GW device 21 returns to the S-GW device 23 either a bearer setup response or a Proxy Binding Acknowledgment (S911). In the case in which GTP is used in sequence S911, the bearer setup response includes the TEID1 for the PDN-GW of the set PDN connection, the PDN type 1, the PDN address 1, and the EPS bearer ID1. In the case of using GRE, the Proxy Binding Acknowledgment is used and mobile network access identifier for the set PDN connection, the PDN connection ID1, the uplink GRE key 1, the PDN type 1, and the PDN address 1 are included within this message. Additionally, the PDN-GW device 21, using the EPS bearer 1, starts transmitting to the S-GW device 23 the user packet that was addresses to the PDN address 1 allocated to the PDN connection 1 set at sequence S910 (S912).

The S-GW device 23, upon receiving the Proxy Binding Acknowledgment or the bearer setup response at sequence S911, associates and records in a management table (PDN connection holding unit 231) the PDN address 1 of these messages, the subscriber identification information, and the MME device 22, and also transmits the Bearer Setup Response to the MME device 22 (S913). The bearer setup response includes the IP address of the S-GW device 23 of the set PDN connection 1, the TEID1 for the S-GW, the PDN type 1, the PDN address 1, and the EPS bearer ID1. The S-GW device 23 begins buffering the user packet transferred from the PDN-GW device 21.

The MME device 22 receives the bearer setup response, and transmits an Attach Accept to the ENB device 31 (S914). This Attach Accept includes the ID address of the S-GW device 23 that received by the Bearer Setup Request, the APN, the PDN connection 1, the TEID1 for the S-GW, the PDN type 1, the PDN address 1, and the EPS bearer ID1. The ENB device 31 transmits to the mobile terminal device 40 the APN that received the Attach Accept as sequence S914, the PDN connection ID1, the PDN type 1, the PDN address 1, and the EPS bearer ID1 (S915).

The mobile terminal device 40, upon receiving the Attach Accept, acquires the PDN type 1 and PDN address 1 included in the received Attach Accept, and also transmits to the ENB device 31 an Attach Complete that includes the EPS bearer ID1 included in the received Attach Accept (S916). Additionally, the mobile terminal device 40 transitions to a state in which user data can be transmitted and received. The ENB device 31, upon receiving the Attach Complete, transmits to the MME device 22 an Attach Complete that includes the EPS bearer ID1 included in the received Attach Complete, the IP address of the ENB device 31, and the TEID1 for the ENB (S917).

Thereafter, when the mobile terminal device 40 uses the PDN address acquired from the Attach Accept at sequence S915 as the transmitting address of origin to transmit the user data addressed to the external PDN 50, the user data is transferred by the bearer 1 within the established PDN connection 1 and, after transmission of the user data up to the PDN-GW device 21, transmission is made to the external PDN 50 (S918).

The MME device 22, upon receiving the Attach Complete at sequence S917, transmits to the S-GW device 23a bearer update request that includes the IP address of the ENB device 31 included in this Attach Complete, the TEID1 for the ENB, and the EPS bearer ID1 (S919). The S-GW device 23, upon receiving this bearer update request, acquires the IP address of the ENB device 31 included in the bearer update request, that is the IP address of the ENB device 31 to which the mobile terminal device 40 is connected, and returns to the MME device 22 the bearer update request that includes the IP address of the ENB device 31 that was included in the received bearer update request (S920). At this point, because the S-GW device 23 has acquired the IP address of the ENB device 31 to which the mobile terminal device 40 is connected, transmission to the ENB device 31, including the buffered part directed at the mobile terminal device 40 that was transferred from the PDN-GW 21, and the ENB device 31 transmits that user packet to the mobile terminal device 40 (S921). The above completes the attachment of the mobile terminal device 40 to the EPS.

Figure 10:
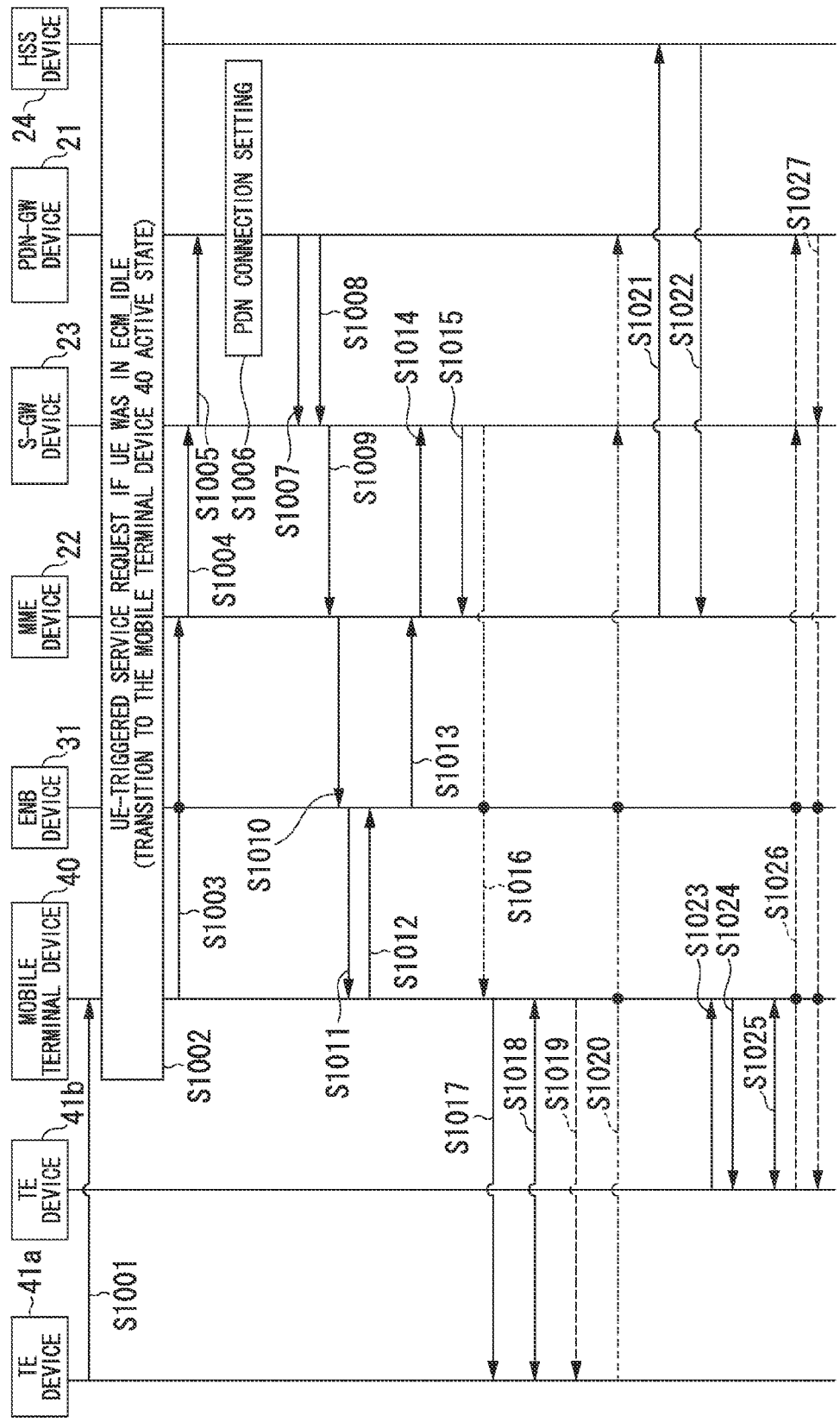
FIG. 10 is a sequence diagram showing an example of connection of the TE device 41a and the TE device 41b to the mobile terminal device 40 in the same embodiment.

Next, in order for the TE device 41a and the TE device 41b to perform communication with the external PDN 50, connection is made to the mobile terminal device 40. FIG. 10 is a sequence diagram that shows an example of the sequence of connection of the TE device 41a and the TE device 41b to the mobile terminal device 40. The TE device 41a places the wireless communication interface unit 412 into the active state, and starts the IP address allocation protocol. The IP address allocation protocol may be an IPv6 Stateless Auto Configuration (IETF RFC 4862) or a DHCPv4 (IETF RFC 2462) or a DHCPv6 (IETF RFC 3315), and is further not limited to these. The description herein uses the example of using the IPv6 Stateless Auto Configuration.

In order to find the default router, the TE device 41a, sends an RS (Router Solicitation) (S1001). The mobile terminal device 40 receives the RS from the TE device 41a and if the mobile terminal device 40 itself has transitioned to the idle (IDLE) state within the EPS, it transitions to the active state in order to perform transmission and reception of communication data (S1002) (refer to TS 23.401, the 3GPP specifications). Then, in order to establish a new PDN connection 2 (TE PDN connection) for the TE device 41a, the TE connection request unit 403 of the mobile terminal device 40 transmits a PDN Connectivity Request to the MME device 22 to the ENB device 31 (S1003).

The PDN Connectivity Request includes an APN and an MNP (Mobile Network Prefix) type (address block type). The APN used is what was acquired from the Attach Accept received from the ENB device 31 in the attach sequence shown in FIG. 9 and, similar to the case of sending the Attach Request at S901, the mobile terminal device 40 may be explicitly indicated. The MNP type is for specifying the address type of the network address (address block) allocated to the PDN connection that is established, and this is either an IPv4 type, which is an address block specified by an IPv4 (Internet Protocol Version 4) network address, or a IPv6 type, which is an address block specified by an IPv6 (Internet Protocol Version 6) prefix, or specified as both. However, this MNP type may be a new address type that extends the PDN type used in the attach sequence of FIG. 9, and may be specified in combination with the PDN type.

The communication control unit 222 of the MME device 22 receives the PDN Connectivity Request and, in order to establish the PDN connection 2, transmits a Bearer Setup Request to the S-GW device 23 (S1004). However, in the case in which the attach processing is continued with the MR function at sequence S906 of FIG. 9 remaining disabled, a PDN Connectivity Refusal is returned to the mobile terminal device 40, and the connection sequence is terminated.

The Bearer Setup Request includes, in addition to the APN and MNP type that are included in the PDN Connectivity Request at sequence S1003, the subscriber identification data, the IP address of the PDN-GW device 21, the PDN connection ID2, the MNP1, and the EPS bearer ID2. The MNP (Mobile Network Prefix) indicates the IPv4 sub-network address or the IPv6 prefix allocated to the PDN connection to be established for the mobile terminal device 40, or both. However, the same information elements as the PDN address may be used for this MNP.

In the case in which the Ipv4 sub-network address or IPv6 prefix allocations are left up to the PDN-GW device 21, the communication control unit 222 stores a NULL address (address not specified). However, in the case in which the mobile terminal device 40 that is the source of the request within the subscription data acquired from the HSS device 24 during the attach procedure of FIG. 9 and stored in the subscriber information holding unit 225 is associated with the information to be identified, and in which the MNP, which is information indicating an address block allocated to the TE PDN connection is specified, that value is stored in the MNP in this Bearer Setup Request (each of the IPv4 sub-network address 2 and the IPv6 prefix 2).

The S-GW device 23 receives the Bearer Setup Request at sequence S1004, and begins the procedure for establishing a default EPS bearer for the TE device 41*a* with the PDN-GW device 21. In the case in which GTP is used as the protocol for implementing the EPS bearer, the S-GW device 23 transmits the Bearer Setup Request to the PDN-GW device 21 (S1005). This Bearer Setup Request includes the subscriber identification information, the IP address of the S-GW device 23, the APN, the PDN connection ID2, the TEID2 for the S-GW, the MNP type, MNP1, and the EPS bearer ID2. This is different from the Bearer Setup Request at sequence S909 in FIG. 9 in that the MNP type 1 and the MNP1 are included in place of the PDN type 1 and the PDN address 1.

In the case in which the GRE is used as the protocol for implementing the EPS bearer, the S-GW device 23 transmits a Proxy Binding Update message to the PDN-GW device 21.

The Proxy Binding Update message includes the mobile network access identifier generated from the subscriber identification information, the APN, the PDN connection ID1, the downlink GRE key, the MNP type 1, and the MNP1. This Proxy Binding Update also differs from the Proxy Binding Update at sequence S909 of the sequence in FIG. 9 in that the MNP type 1 and the MNP1 are included in place of the PDN type 1 and the PDN address 1.

The PDN connection setting unit 212 of the PDN-GW device 21 receives a Bearer Setup Request or a Proxy Binding Update at sequence S1005, and begins the setting of the PDN connection 2 (S1006). First, the PDN connection setting unit 212, in the case in which a specific IPv4 sub-network address and a specific IPv6 prefix are not specified in the MNP1, allocates, from the address block pool held by the address block holding unit 211, an address block of the type specified by the MNP1 of the Bearer Setup Request or the Proxy Binding Update, that is, an IPv4 sub-network address 2 or IPv6 prefix 2 or both to the MNP1. The PDN connection 2 is then allocated to the MNP1. Additionally, a default EPS bearer 2 that is associated with the PDN connection 2 is established. When this is done, the PDN connection setting unit 212 causes the PDN connection holding unit 214 to store information indicating the address block allocated to the MNP1 and information regarding the PDN connection 2.

By doing this, the user data transfer unit 215 joins user data addressed to the MNP1 from the external PDN 50 to the above-noted EPS bearer 2 that has been established. Addressing to the MNP1 indicates that the user data allocated to the address belonging to the address block of the MNP1.

Then, the PDN-GW device 21 returns to the S-GW device 23 either a bearer setup response or a Proxy Binding Acknowledgment (S1007). In the case in which GTP is used, the bearer setup response is used at this sequence S1007, and the bearer setup response includes the TEID2 for the PDN-GW, MNP1, and the EPS bearer ID2. In the case of using GRE, the Proxy Binding Acknowledgement is used, and the message includes therein the mobile network access identifier, the PDN connection ID2, the uplink GRE key 2, the MNP type 1, and MNP1. Additionally, the transfer of the user packet addressed to MNP1 from the external PDN 50 up to the S-GW device 23 is started (S1008).

Figure 11:
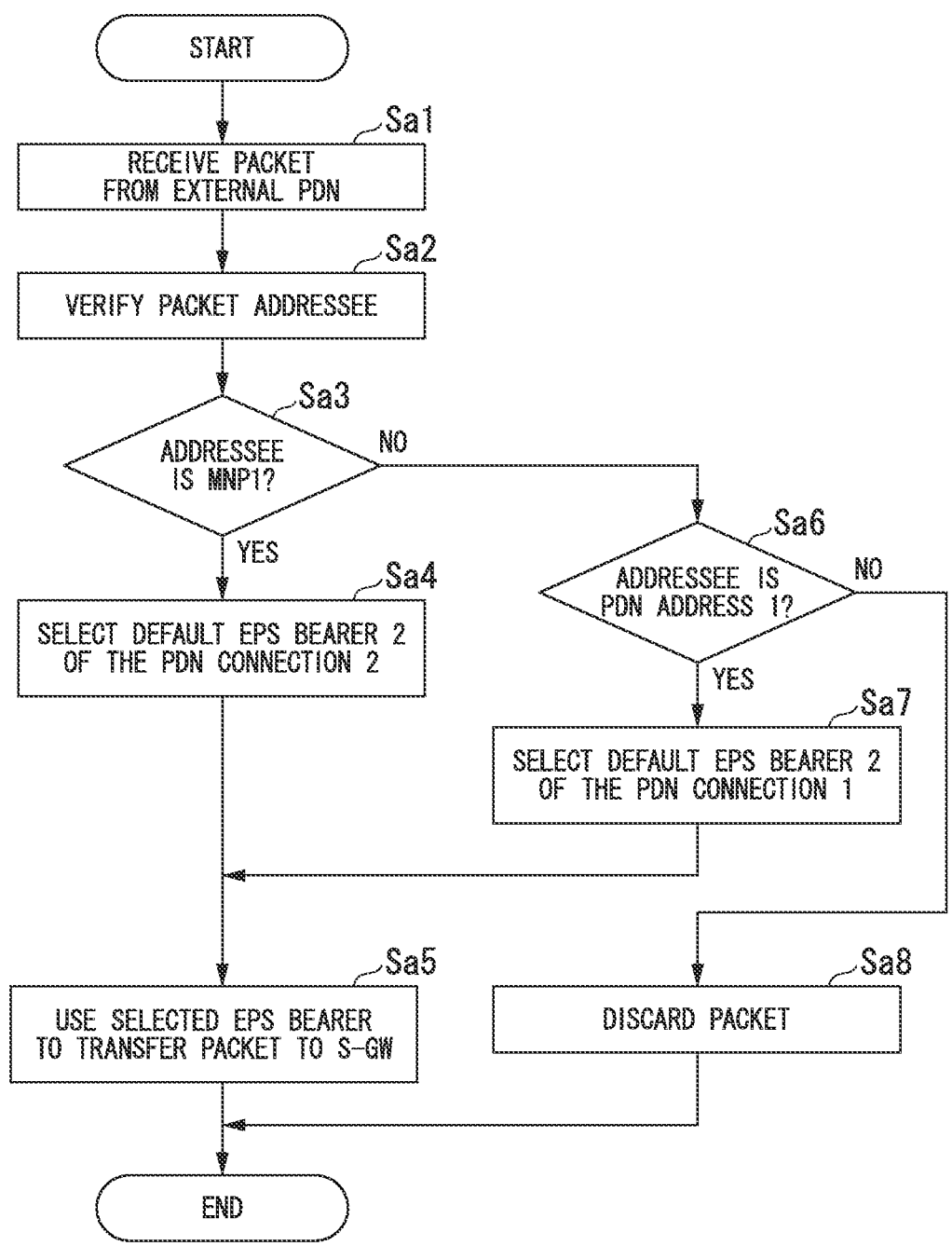
FIG. 11 is a flowchart showing the packet transfer processing of the PDN-GW device 21 in the same embodiment.

The packet transfer process that the PDN-GW device 21 starts at sequence S1008 will now be described. FIG. 11 is a flowchart showing the packet transfer of the PDN-GW device 21. First, the PDN-GW device 21, upon receiving a packet from the external PDN 50 (Sa1), checks the addressee of the packet (Sa2). The PDN-GW device 21 judges whether or not the destination of the pack is MNP1 (refer to sequence S1004 in FIG. 10) (Sa3), and if this is the case (YES at Sa3), selects the default EPS bearer (bearer between the external PDN 50 and the TE device 41*a*) corresponding to MNP1 (Sa4), after which it transitions to step Sa5.

At step Sa3, if the judgment is that there is no agreement (NO at Sa3), transition is made to step Sa6, and the PDN-GW 21 judges whether the destination of the packet agrees with the PDN address 1 (refer to sequence 5908 in FIG. 9) (Sa6) and, if the judgment is that there is agreement (YES at Sa4), after selecting the default EPS bearer (bearer between the external PDN 50 and the mobile terminal device 40) of the PDN connection 1 corresponding to the PDN address 1, transition is made to step Sa5.

At step Say, using the EPS bearer selected at the previous step (step Sa4 or Sa7), the packet received at step Sa1 is transferred to the S-GW device 23, and the processing is terminated. If the judgment is made at step Sa6 that there is no agreement (NO at Sa6), the PDN-GW device 21 judges that the packet received at step Sa1 is not a packet destined for the currently managed mobile terminal device 40 or TE device 41*a*, discards the packet (Sa8) and terminates processing. Although the example described here is that of one mobile terminal device 40 connected to the TE device 41*a*, in the case in which a plurality of mobile terminal devices 40 or TE devices 41*a* have connections established with the PDN-GW device 21, the same type of processing is performed for these devices as well before discarding the packet.

Returning to FIG. 10, when the bearer setup response or Proxy Binding Acknowledgment of sequence S1007 is received, the S-GW device 23 associates MNP1, the subscriber identification information, and the MME device 22 and stores them in a management table (PDN connection holding unit 231), and also transmits a bearer setup response to the MME device 22 (S1009). The bearer setup response includes the IP address of the S-GW device 23, the TEID2 for the S-GW, the MNP type 1, MNP1, and the EPS bearer ID2. The S-GW device 23 begins buffering the user packet addressed to MNP1 transferred from the PDN-GW device 21.

The MME device 22 receives the bearer setup response, and transmits a PDN Connectivity Accept to the ENB device 31 (S1010). The PDN Connectivity Accept includes the IP address of the S-GW device 23, the APN, the PDN connection ID2, the TEID2 for the S-GW, the MNP type 1, MNP1, and the EPS bearer ID2. The ENB device 31 that receives the PDN Connectivity Accept transmits to the mobile terminal device 40*a* PDN Connectivity Accept that includes the APN, the PDN connection ID2, the MNP type 1, MNP1, and the EPS bearer ID2 (S1011).

The mobile terminal device 40 receives the PDN Connectivity Accept, acquires the MNP type 1 and MNP1, and transmits to the ENB device 31 an RRC Connection Reconfiguration Complete that includes the EPS bearer ID2 (S1012). The ENB device 31, upon receiving the RRC Connection Reconfiguration Complete, transmits to the MME device 22 a bearer setup response that includes the IP address of the ENB device 31, the TEID2 for the ENB, and the EPS bearer ID2 (S1013).

The MME device 22, upon receiving the bearer setup response, transmits to the S-GW device 23 a Bearer Update Request that includes the IP address of the ENB device 31, the TEID2 for the ENB, and the EPD bearer ID2 (S1014). Upon receiving the Bearer Update Request, the S-GW device 23 returns to the MME device 22 a Bearer Update Request that includes the EPS bearer ID2 (S1015). Because the S-GW device 23 acquires the IP address of the ENB device 31 to which the TE device 41*a* is connected from the Bearer Update Request of sequence S1014, the transfer to the ENB device 31 of the part of the user packet addressed to the TE device 41*a* that has been transferred from the PDN-GW device 21 and buffered is also begun, and the ENB device 31 transfers that user packet to the mobile terminal device 40 (S1016).

The mobile terminal device 40 that transmitted the RRC Connection Reconfiguration Complete to the ENB device 31 at sequence S1012 uses the acquired MNP1 to allocate an IP address to the TE device 41*a*. Although in this description the IPv6 prefix 2 set into MNP1 is set, it would be similar in the case in which the IPv4 sub-network address is set. Also, when both the IPv4 sub-network address and the IPv6 prefix 2 are set, one of the protocols supported by the TE device 41*a* is selected and used.

First, the mobile terminal device 40 generates an RA (Router Advertisement) that sets the IPv6 prefix 2, and transmits this to the TE device 41*a* (S1017). The TE device 41*a*, upon receiving the Router Advertisement, extracts the IPv6 prefix 2 from the Router Advertisement and automatically generates an IPv6 address. Also, DAD (Duplicate Address Detection) with respect to the generated address is performed with the mobile terminal device 40 to verify that the generated address is unique (S1018).

When the TE device 41*a* verifies by duplicate address detection that the IPv6 address is unique, it becomes possible to transmit and receive user data via the MT connection wireless communication unit 412. The user packet addressed to MNP1 and transferred from the PDN-GW 21 is transferred up to the mobile terminal device 40 via the S-GW device 23 and the ENB device 31, and the mobile terminal device 40 transfers it to the TE device 41*a* via the TE connection wireless communication unit 408 (S1019).

When the mobile terminal device 40 receives the user packet from the TE device 41*a*, the routing function of the mobile terminal device 40 routes the user data in accordance with the transmission destination address of the user data. In the case in which the transmission destination address is MNP1 or the mobile terminal device 40 itself, the mobile terminal device 40 transfers it directly to the addressee. For any other transmission destination address, the user data is transferred to the EPS bearer within the established PDN connection 2, and is transferred up to the PDN-GW device 21 and transmitted to the external PDN 50 by the PDN-GW device 21 (S1020).

The MME device 22, after receiving the Bearer Update Response of the sequence S1015, transfers the Location Information Update Request to the HSS device 24 (S1021). This Location Information Update Request includes information of the established PDN connection 2, and includes the APN, the PDN connection ID2, the IP address of the PDN-GW device 21, the MNP type 1, and MNP1. The HSS device 24, upon receiving this Location Information Update Request it stores this information into the subscriber's subscription data, so that when the mobile terminal device 40 re-attaches to the EPS and performs a PDN Connectivity Request, when the power is turned on or off, or the like, the same MNP1 is allocated. The HSS device 24 also transmits the Location Information Update Request to the MME device 22 (S1022).

After the above, when a TE device 41*a* is connected anew to the mobile terminal device 40 and transmits a Router Solicitation (S1023), the mobile terminal device 40, without establishing a new PDN connection, performs allocation of an IP address, using the MNP1 that had already been acquired for the TE device 41*a*. That is, similar to the case of sequence S1017, the mobile terminal device 40 transmits to the TE device 41*b* a Router Advertisement that sets the IPv6 prefix 2 (S1024). The TE device 41*b*, upon receiving the Router Advertisement, executes the generation of an IP address and Duplicate Address Detection (S1025), similar to the TE device 41*a*, and transmitting and receiving user data with the external PDN 50 becomes possible (S1026, S1027). The sequences S1023 to S1025 are applied to every TE from the second and subsequent units.

After the TE device 41*a* connects to the mobile terminal device 40, without waiting for the RRC Connection Reconfiguration Complete (sequence S1012) of the mobile terminal device 40, in the case in which the TE device 41*b* has connected to the mobile terminal device 40, the mobile terminal device 40, without performing a PDN Connectivity Request anew, waits for the PDN Connectivity Accept of sequence S1011, and transmits to the TE device 41b the Router Advertisement that sets the MNP1 for which notification was made by the PDN Connectivity Accept.

In the case in which DHCP is used as the method for allocating an IP address to the TE, the IPv4 sub-network address 2, the IPv6 prefix, or both, which are acquired from MNP1 at the sequence S1011 are recorded as the address pool in the DHCP server within the mobile terminal device 40, and a DHCP Offer (IP address provision notification) that includes the allocated IP address is transmitted to the TE that has sent the DHCP Request (IP address allocation request notification).

In this manner, in the present embodiment, by a PDN Connectivity Request, the mobile terminal device 40 acquires one address block (one IPv6 prefix or one IPv4 sub-network address, or both), and shares it with a plurality of TEs that are connected to the mobile terminal device 40. By doing this, regardless of the number of TEs that are connected, it is possible to simultaneously connect a plurality of TEs to the external PDN 50 by establishing only one PDN connection.

Because communication between TEs is solved by routing between TE and UE (mobile terminal device 40), this can be implemented without using the resources of the core network 20 and the wireless access system 30. Additionally, because it is possible to set a QoS or a charging rule in units of EPS bearers, it is possible to allocate a QoS class and charging rule separately to user data that is transmitted and received by the mobile terminal device 40 itself via the external PDN 50, and to user data that is transmitted and received with each TE via the external PDN 50.

In this manner, the communication system of the present embodiment allocates one PDN connection and provides a connection to the external PDN 50 to a plurality of TEs (TE devices 41a and 41b) connected to the one mobile terminal device 40 that functions as both a UE and an MT. By doing this, it is possible to reduce the overall communication system administrative information, and to reduce the number of signaling messages.

Second Embodiment

The second embodiment of the present invention is described below, with references made to drawings. The mobile communication system 10a in the present embodiment has a configuration similar to that of the mobile communication system 10 of the first embodiment, although it differs in that, in place of the mobile terminal device 40, it is provided with a mobile terminal device 40a. By doing this, in contrast to the first embodiment, in which, after completion of the establishment of the PDN connection 1 for the UE, a PDN connection for the TE is established, in the present embodiment the establishment of the PDN connection for the TE is done simultaneously with the EPS attach of the UE.

Figure 12:
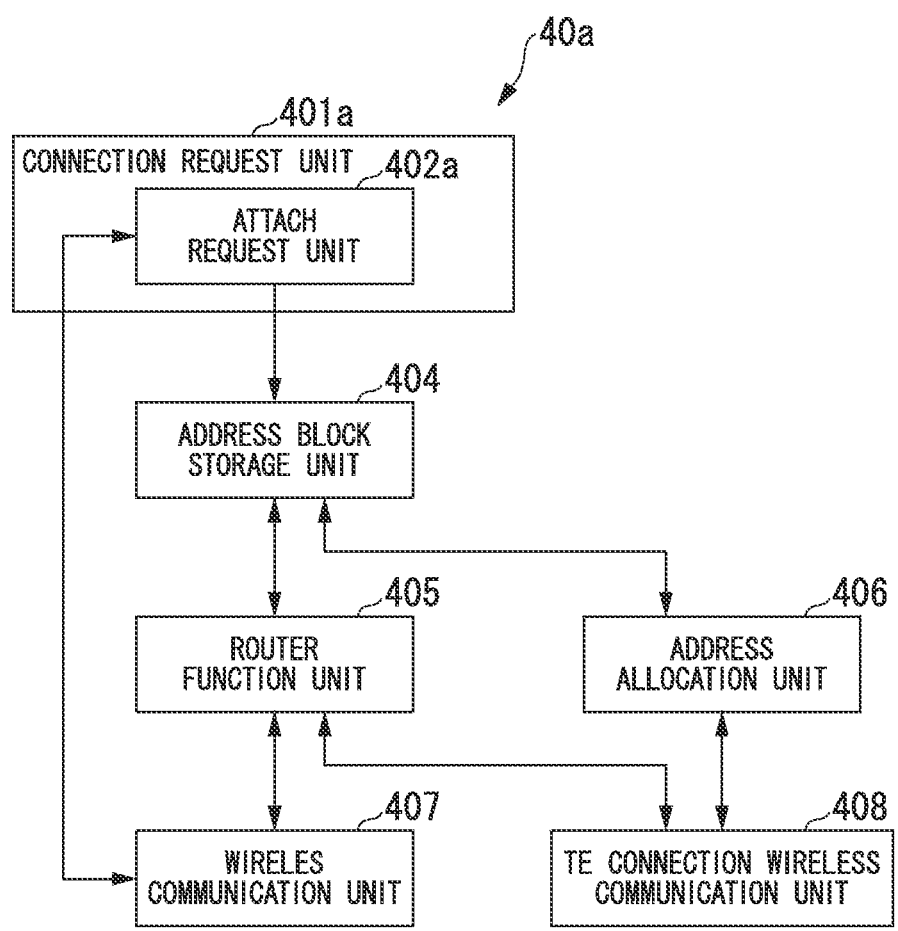
FIG. 12 is a simplified block diagram showing the configuration of a mobile terminal device 40a in a second embodiment of the present invention.

FIG. 12 is a simplified block diagram showing the configuration of the mobile terminal device 40a in the present embodiment. The mobile terminal device 40a has a connection request unit 401a, an address block storage unit 404, a router function unit 405, an address allocation unit 406, a wireless communication unit 407, and a TE connection wireless communication unit 408. Elements in this drawing that correspond with elements in FIG. 7 are assigned the same reference numerals, and the description thereof is omitted. The connection request unit 401a has an attach request unit 402a. The attach request unit 402a, when sending an Attach Request to the core network 20 via the ENB device 31, includes a request for PDN connection setup. By this request, the attach request unit 402a receives from the core network 20, via the ENB device 31, the IP address and information indicating the address block allocated to the PDN connection for the TE (IPv4 network address or IPv6 prefix).

Figure 13:
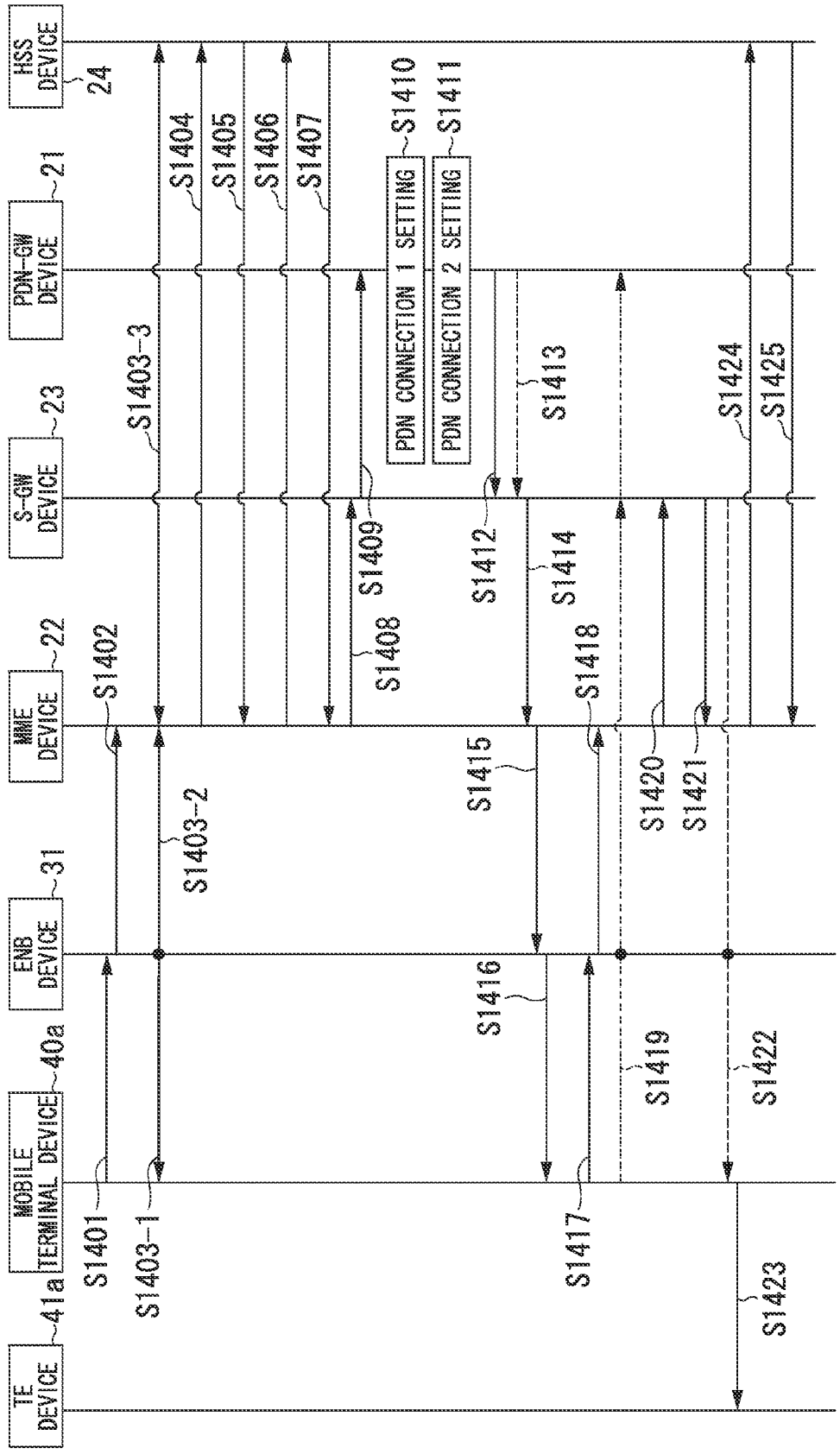
FIG. 13 is a sequence diagram showing an example of the sequence of attaching the mobile terminal device 40a to an EPS in the same embodiment.

FIG. 13 is a drawing showing an example of the sequence of attaching the mobile terminal device 40a to the EPS in the present embodiment. Because from sequence S1401 to S1407 is the same as from sequence S901 to S907 in the first embodiment (FIG. 9), the description thereof will be omitted. After completion of S1407, the MME device 22 transmits a Bearer Setup Request to the S-GW device 23 for the purpose of establishing a default EPS bearer (S1408). In order to simultaneously establish the PDN connection 1 for the UE and the PDN connection 2 for the TE, this Bearer Setup Request includes, in addition to the subscriber identification information and the IP address of the PDN-GW device 21, the APN, the PDN connection ID1, the PDN type 1, the PDN address 1, and the EPS bearer ID1 for establishing the PDN connection 1 for the UE, and the APN, the PDN connection ID2, the MNP type 1, MNP, and EPS bearer ID2 for establishing the PDN connection 2 for the TE. In the case in which the PDN connection ID is an identifier that is independent from the APN, one APN only may be included.

The S-GW device 23 receives the Bearer Setup Request, and starts the procedure for establishing the default EPS bearer with the PDN-GW device 21. In the case in which GTP is used between the S-GW device 23 and the PDN-GW device 21, the S-GW device 23 transmits a Bearer Setup Request to the PDN-GW device 21 (S1409). This Bearer Setup Request includes the subscriber identification information, the IP address of the S-GW device 23, the APN and PDN connection ID1, the TEID1 for the S-GW, the PDN type 1, the PDN address 1, the EPD bearer ID1, the APN and PDN connection ID2, the TEID2 for the S-GW, the MNP type 1, MNP1, and the EPS bearer ID2.

In the case in which GRE is used between the S-GW device 23 and the PDN-GW device 21, at the sequence S1409, the S-GW device 23 transmits to the PDN-GW device 21 a Proxy Binding Update message. The Proxy Binding Update message includes the mobile communication network access identifier, the APN and PDN connection ID1, the downlink GRE key 1, the PDN type 1, the PDN address 1, and the EPS bearer ID1, and the APN and PDN connection ID2, the downlink GRE key 2, the MNP type 1, MNP1, and the EPS bearer ID2.

The PDN-GW device 21 receives the Bearer Setup Request or Proxy Binding Update of the sequence S1409, and starts the setup of the PDN connection 1 and the PDN connection 2 (S1410 and S1411). The PDN connection 1 setup method of the sequence S1410 is in accordance with S910 of the first embodiment. The PDN connection 2 setup method of the sequence S1411 is in accordance with S1006 of the first embodiment.

When the setup of the PDN connection 1 and the setup of the PDN connection 2 are completed, the PDN-GW device 21 returns a Bearer Setup Response or a Proxy Binding Acknowledgment to the S-GW device 23 (S1412). In the case in which GTP is used, the Bearer Setup Response is used in the sequence S1412, and the Bearer Setup Response includes the TEID1 for the PDN-GW, the PDN type 1, the PDN address 1, and the EPS bearer ID1 for the PDN connection 1, and the TEID2 for the PDN-GW, the MNP type 1, MNP1, and the EPS bearer ID2 for the PDN connection 2.

In the case in which GRE is used, the Proxy Binding Acknowledgment is used, and the Proxy Binding Acknowledgment includes the mobile network access identifier, the PDN connection ID1, the uplink GRE key 1, the PDN type 1, the PDN address 1, the PDN connection ID2, the uplink GRE key 2, the MNP type 1, and MNP1.

Additionally, the PDN-GW device 21 begins transfer up to the S-GW device 23 of a user packet addressed to the PDN address 1 from the external PDN 50, using the established EPS bearer 1. Also, transfer up to the S-GW device 23 of the user packet addressed to MNP1 from the external PDN 50 begins, using the established EPS bearer 2 (S1413).

When the Proxy Binding Acknowledgment or the Bearer Setup Response of the sequence S1412 is received, the S-GW device 23 associates and records in a management table (PDN connection holding unit 231) the PDN address 1, MNP1, the subscriber identification information, and the MME device 22, and also transmits the Bearer Setup Response to the MME device 22 (S1414). The Bearer Setup Response includes the IP address of the S-GW device 23, the TEID1 for the S-GW, the PDN type 1, the PDN address 1, and the EPS bearer ID1 for PDN connection 1, and the TEID2 for the S-GW, the MNP type 1, MNP1 and the EPS bearer ID2 for PDN connection 2. The S-GW device 23 begins buffering the user packets transferred from the PDN-GW device 21 addressed to the PDN address 1 and addressed to MNP1 (S1413).

The MME device 22 receives the Bearer Setup Response, and transmits an Attach Accept to the ENB device 31 (S1415). The Attach Accept includes the IP address of the S-GW device 23, the APN, the PDN connection ID1, the TEID1 for the S-GW, the PDN type 1, the PDN address 1, and the EPS bearer ID1 for the PDN connection 1, and the APN, the PDN connection ID2, the TEID2 for the S-GW, the MNP type 1, MNP1, and the EPS bearer ID2 for the PDN connection 2.

The ENB device 31 transmits to the mobile terminal device 40a an Attach Accept that includes the APN, the PDN connection ID1, the PDN type 1, the PDN address 1, and the EPS bearer ID1 for the PDN connection 1, and the APN, PDN connection ID2, the MNP type 1, MNP1, and the EPS bearer ID2 for the PDN connection 2 (S1416). The mobile terminal device 40a receives the Attach Accept, acquires the PDN type 1, the PDN address 1, the MNP type 1, and MNP1 included therein, and transmits to the ENB device 31 an Attach Complete that includes the EPS bearer ID1 and the EPS bearer ID2 (S1417). The mobile terminal device 40a also transitions to the state in which user data can be transmitted and received.

The ENB device 31 receives the Attach Complete, and transmits to the MME device 22 an Attach Complete that includes the IP address of the ENB device 31, the TEID1 for the ENB, the EPS bearer ID1, the TEID2 for the ENB, and the EPS bearer ID2 (S1418).

At this point, when the mobile terminal device 40a transmits user data addressed to the external PDN 50, after the user data is transferred up to the PDN-GW device 21, using the EPS bearer 1 within the established PDN connection 1, it is sent to the external PDN 50 (S1419).

When the Attach Complete of the sequence S1418 is received, the MME device 22 transmits to the S-GW device 23 a Bearer Setup Request that includes the IP address of the ENB device 31, TEID1 for the ENB, the EPS bearer ID1, TEID2 for the ENB, and the EPS bearer ID2 (S1420). The S-GW device 23 returns to the MME device 22 a Bearer Update Response that includes the EPS bearer ID1 and the EPS bearer ID2 (S1421).

The S-GW device 23 that has received the Bearer Update Request of sequence S1420 acquires the IP address of the ENB device 31 to which the mobile terminal device 40a is connected from the Bearer Update Request, and begins to transfer to the ENB device 31 a user packet transferred from the PDN-GW device 21 to the mobile terminal device 40a and to the TE device 41a (addressed to MNP1) that had been buffered, and the ENB device 31 transmits that user packet to the mobile terminal device 40a (S1422).

The mobile terminal device 40a that transmitted the Attach Complete at sequence S1417 to the ENB device 31 begins the allocation (Router Advertise transmission) of the IP address to the TE device 41a, using the IPv4 sub-network address 2 and the IPv6 prefix 2 set into the MNP1 of the Attach Accept in the sequence S1416 (S1423).

The MME device 22, after receiving the Bearer Update Request of sequence S1421, transmits a Location Information Update Request to the HSS device 24 (S1424). This Location Information Update Request includes information of the established PDN connection 1 and PDN connection 2, which includes the address of the PDN-GW device 21, the APN, the PDN connection ID1, the PDN type 1, and the PDN address 1 as PDN connection 1 information, and the APN, the PDN connection ID2, the MNP type 1, and MNP1 as the PDN connection 2 information. The HSS device 24 stores this information into the subscriber's subscription data, and when the power to the mobile terminal device 40a is turned on or off, or the like, so that the mobile terminal device 40a attaches once again to the EPS, the same MNP1 is allocated. The HSS device 24 also transmits a Location Information Update Acknowledgment (Update Location Ack) to the MME device 22 (S1425).

The above completes the simultaneous attach of the mobile terminal device 40a to the EPS and the establishment of the PDN connection 2 for the TE. Although in this example there are two PDN connections that are established simultaneously, two is not a limitation, and the same type of method can be used to simultaneously three or more PDN connections.

In this manner, even at the stage at which the TE has not been started, by establishing a PDN connection for the TE simultaneously with the attach of the mobile terminal device 40a to the EPS, it is possible to combine the establishment of a plurality of PDN connections into a single signaling, thereby reducing the number of signaling messages in the overall system, and shortening the time required to establish all the PDN connections. Also, after the TE is started, it is possible to establish connectivity to the external PDN 50 immediately.

Third Embodiment

The third embodiment of the present invention is described below, with references made to drawings. The mobile communication system 10b in the present embodiment has a configuration similar to that of the mobile communication system 10 of the first embodiment, although it differs in that, in place of the PDN-GW device 21, it is provided with a PDN-GW device 21b, and that, in place of the mobile terminal device 40, it is provided with a mobile terminal device 40b. By doing this, in contrast to the first embodiment, in which a NAS signaling message set forth in the 3GPP standard is used to allocate an address block to the UE, in the present embodiment the DHCP (Dynamic Host Configuration Protocol) v6 Prefix Delegation (IETF RFC 3633) is used to allocate an address block to the UE.

Figure 14:
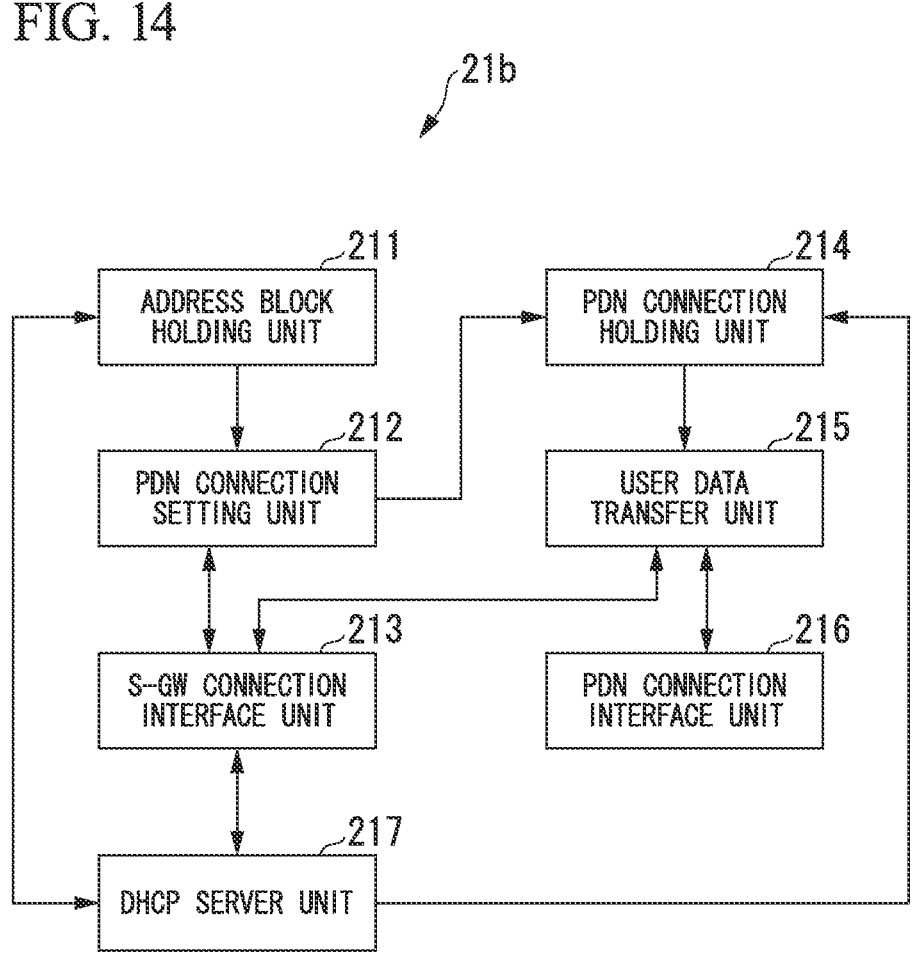
FIG. 14 is a simplified block diagram showing the configuration of a PDN-GW device 21b in a third embodiment of the present invention.

FIG. 14 is a simplified block diagram showing the configuration of the PDN-GW device 21b in the present embodiment. The PDN-GW device 21b in the present embodiment, is the PDN-GW device 21 shown in FIG. 2 with the addition of a DHCP server unit 217. The DHCP server unit 217, upon receiving an address block request using the DHCP, allocates an address block to the PDN connection for the TE of the mobile terminal device 40b originating the request, and send this to the mobile terminal device 40b. In the case in which GRE is used as the tunneling protocol for implementing an EPS bearer between the S-GW device 23 and the PDN-GW device 21b, the S-GW device 23 has a DHCP relay function (not shown).

Figure 15:
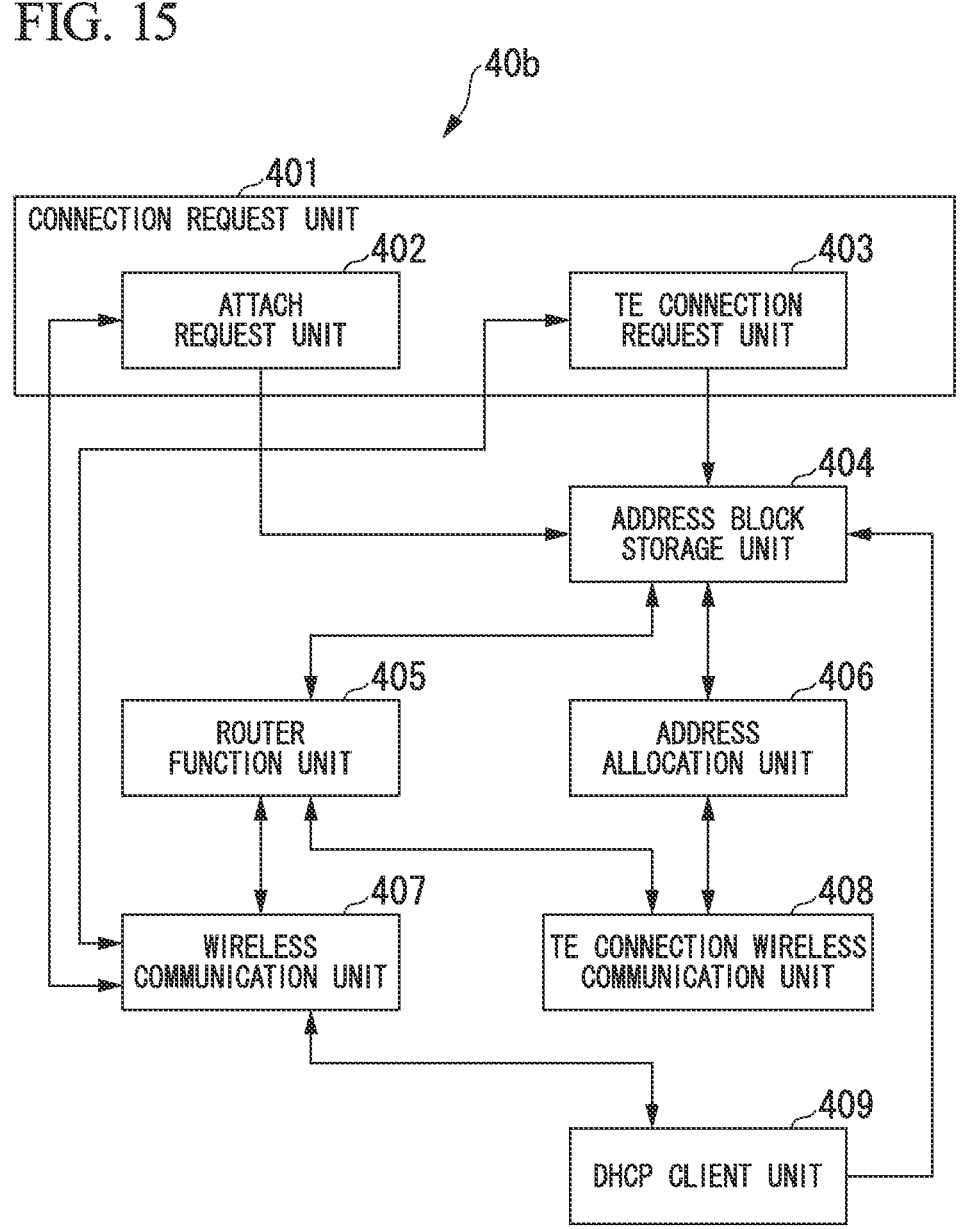
FIG. 15 is a simplified block diagram showing the configuration of a mobile terminal device 40b in the same embodiment.

FIG. 15 is a simplified block diagram showing the configuration of the mobile terminal device 40b in the present embodiment. The mobile terminal device 40b in the present embodiment is the mobile terminal device 21 with the addition of a DHCP client unit 409. The DHCP client unit 409 uses a dynamic host setup protocol to request an address block from the PDN-GW device 21b, and receives from the PDN-GW device 21b information that indicates the address block allocated to the PDN connection for the TE by the request.

Figure 16:
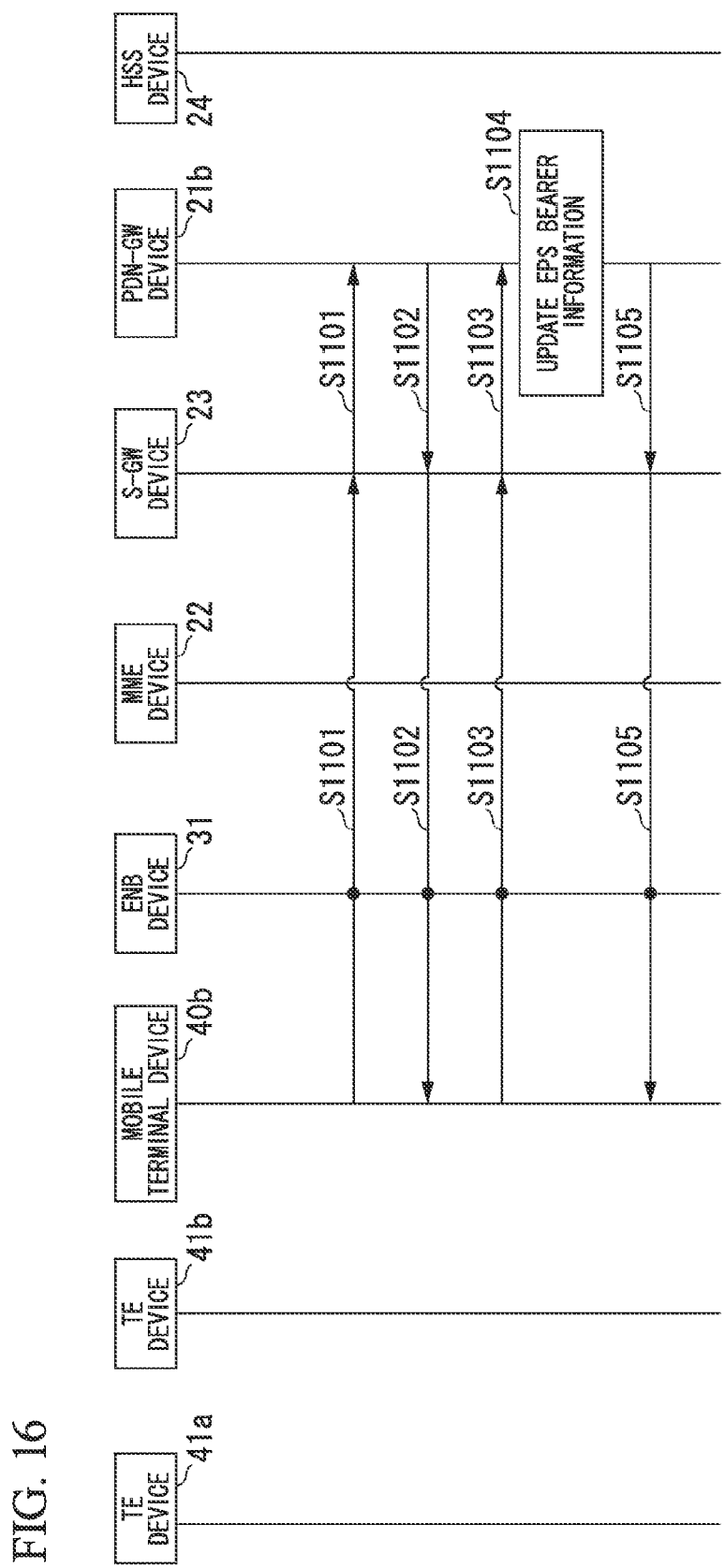
FIG. 16 is a sequence diagram showing an example of the sequence of connection of the mobile terminal device 40b in the same embodiment.

FIG. 16 is a sequence diagram showing an example of the connection sequence of the mobile terminal device 40b in the present embodiment. The sequence shown in FIG. 16 is a sequence that is started by the mobile terminal device 40b after the sequence S1012 of FIG. 10. The mobile terminal device 40b, after transmitting to the ENB device 31 an RRC Connection Reconfiguration Complete of sequence S1012, rather than using MNP1 that is acquired at sequence S1011, starts the DHCP sequence indicated below for acquiring the address block anew.

The DHCP client 409 of the mobile terminal device 40b first, to find the DHCP server, transmits a DHCP Solicit message by a link-local broadcast transmission (S1101). In the case in which GRE is used between the S-GW device 23 and the PDN-GW device 21b, because the S-GW device 23 functions as the default router of the mobile terminal device 40b, the S-GW device 23 receives the DHCP Solicit message and transfers it to the PDN-GW device 21b, using the DHCP relay function. In the case in which GTP is used, because the PDN-GW device 21b functions as the default router, the DHCP Solicit message transmitted by the mobile terminal device 40b reaches the PDN-GW device 21b directly.

The DHCP server unit 217 provided in the PDN-GW device 21b receives the DHCP Solicit message and transmits a DHCP Advertise message that stores the IP address of the DHCP server unit 217 (S1102). In the case in which GRE is used, in the same manner the DHCP relay function in the S-GW device 23 transfers the DHCP Advertise message to the mobile terminal device 40b. When the DHCP client unit 409 of the mobile terminal device 40b receives the DHCP Advertise message and acquires the IP address of the DHCP server unit 217 of the PDN-GW device 21b, a DHCP Request message in which is stored the IPv6 prefix length (in this case 48) for which allocation is desired is transmitted to the DHCP server unit 217 of the PDN-GW device 21b (S1103).

The DHC server unit 217 of the PDN-GW device 21b receives the DHCP Request message from the mobile terminal device 40b and extracts the IPv6 prefix 3, which corresponds to the requested prefix length (provisionally 2001:1000::/48) from the address pool stored by the address block holding unit 214 of the corresponding device and assigns it to the PDN connection 2. Additionally, the MNP1 that was assigned to the PDN connection 2 at sequence S1006 is released and returned to the address pool that is managed by the PDN-GW device 21b, the new IPv6 prefix 3 is allocated to MNP1, and the setting is made so that a user packet directed at the IPv6 prefix 3 from the external PDN 50 is linked to the EPS bearer 2, and transferred up to the S-GW device 23 (S1104).

Then, the DHCP server unit 217 of the PDN-GW device 21b stores the IPv6 prefix 3 in the DHCP Reply message, and transmits it to the mobile terminal device 40b (S1105). In the case in which GRE is used, because the S-GW device 23 receives the DHCP Reply message, similar to the case of the PDN-GW device 21b, the MNP1 that had been allocated to the PDN connection 2 is updated and the IPv6 prefix 3 is allocated, and the DHCP Reply message is transferred to the mobile terminal device 40b.

The DHCP client unit 409 of the mobile terminal device 40b acquires the DHCP Reply message and, using the allocated IPv6 prefix 3, allocates an address to the mobile terminal device 40b, similar to sequences S1017 and S1018 of the first embodiment (FIG. 10).

Although this description is for the example in which IPv6 is selected as the MNP type, the same would apply if the MNP type were to be IPv4.

In this manner, by acquiring the IPv6 prefix or the IPv4 sub-network prefix by DHCP, it is possible to freely set the prefix length, and to acquire the required number of address blocks by one procedure, further enabling the combination of all communication that uses an IP address generated from the address blocks into one PDN connection.

Fourth Embodiment

The fourth embodiment of the present invention is described below, with references made to drawings. The mobile communication system 10 in the present embodiment is a configuration similar to that of the mobile communication system 10 of the first embodiment, although it differs in that, in place of the PDW-GW device 21, it is provided with a PDN-GW device 21c, and that, in place of the mobile terminal device 40, it is provided with a mobile terminal device 40c. By doing this, in contrast to the first embodiment, in which one IPv4 sub-network address or one IPv6 prefix or both are assigned to a plurality of TEs and the plurality of TEs share one PDN connection, in the present embodiment while an IPv6 prefix is shared by a plurality of TEs, different PDN connections are used for each TE.

Figure 17:
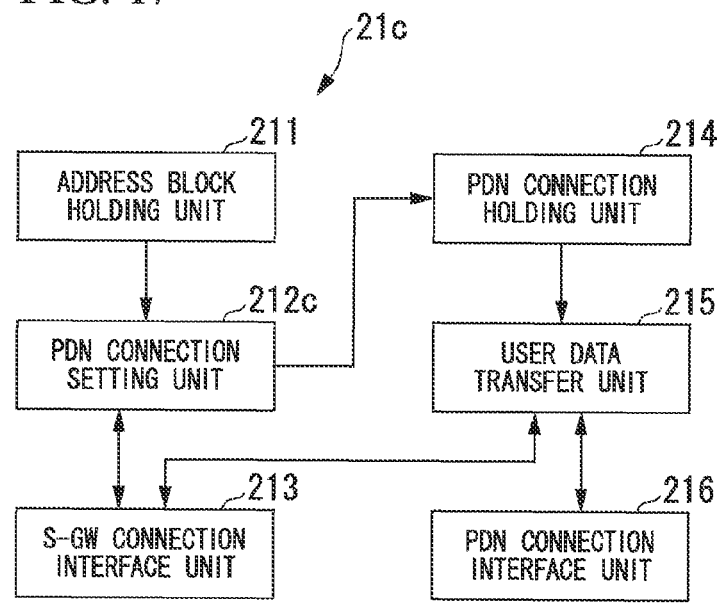
FIG. 17 is a simplified block diagram showing the configuration of a PDN-GW device 21c in a fourth embodiment of the present invention.

FIG. 17 is a simplified block diagram showing the configuration of the PDN-GW device 21c. The PDN-GW device 21c has an address block holding unit 211, a PDN connection setup unit 212c, an S-GW connection interface unit 213, a PDN connection holding unit 214, a user data transfer unit 215, and a PDN connection interface unit 216. The descriptions of reference numerals in this drawing that are the same as in FIGS. 2 (211 and 213 to 216) have been omitted. The PDN connection setup unit 212c performs the same type of setup of the PDN connection for the UE as the PDN connection setup unit 212. However, the PDN connection setup unit 212c, upon receiving a request for the setup of a PDN connection for the TE from the mobile terminal device 40c, associates an address belonging to the address block allocated to the PDN connection for the TE with information regarding the PDN connection for the TE, causes the PDN connection holding unit 214 to store these, and transmits the allocated address to the mobile terminal device 40c.

Figure 18:
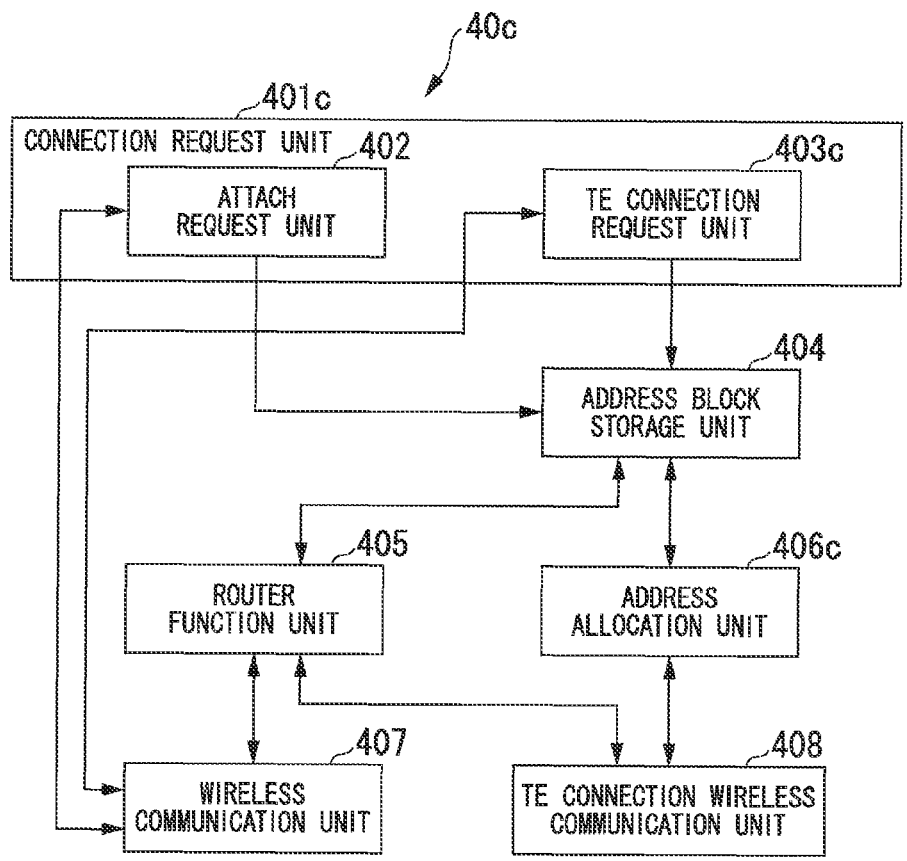
FIG. 18 is a simplified block diagram showing the configuration of a mobile terminal device 40c in the same embodiment.

FIG. 18 is a simplified block diagram showing the configuration of the mobile terminal device 40c. The mobile terminal device 40c has a connection request unit 401c, an address block storage unit 404, a router function unit 405, an address allocation unit 406c, a wireless communication unit 407, and a TE connection wireless communication unit 408. The connection request unit 401c has an attach request unit 402 and a TE connection request unit 403c. The descriptions of reference numerals in this drawing that are the same as in FIGS. 7 (402, 404, 405, 407, and 408) have been omitted. The TE connection request unit 403c, upon receiving a connection request from the TE devices 41a and 41b, request the core network 20 to setup a TE PDN connection, and receives as a response to the request information that indicates the address that was allocated to the PDN connection for the TE. The TE connection request unit 403c causes the received address to be stored in the address block storage unit 404. The address allocation unit 406c allocates the address stored in the address block storage unit 404, that is, the address received by the PDN connection request unit 403c to the TE devices 41a and 41b.

Figure 19:
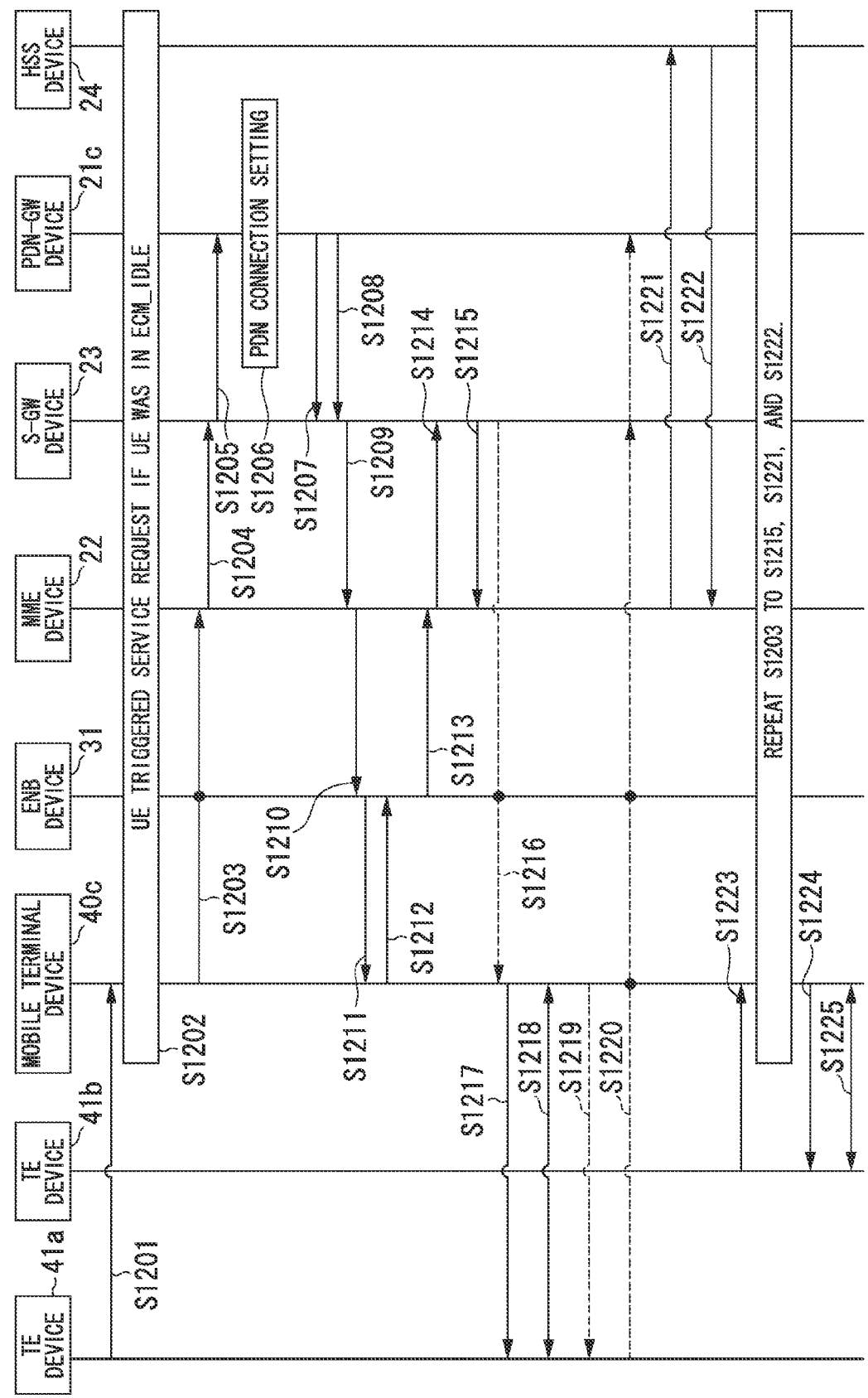
FIG. 19 is a sequence diagram showing an example of the sequence of the connection for the TE devices 41a and 41b performing communication with an external PDN 50 in the same embodiment.

FIG. 19 is a sequence diagram showing an example of the sequence of the connection for the TE devices 41a and 41b performing communication with an external PDN 50. In this sequence example, the sequence starts from the condition in which the sequence shown in FIG. 9 of attachment of the mobile terminal device 40c to the EPS in the first embodiment has already been completed. First, the TE device 41a places the MT connection wireless communication unit 412 in the active state, the IP address is allocated and the protocol is started. This description is for the case in which IPv6 Stateless Auto Configuration is sued as the IP address allocation protocol.

The TE device 41a, in order to search for the default router, transmits a Router Solicit (S1201). The mobile terminal device 40c receives the Router Solicit from the TE device 41a and if the mobile terminal device 40c itself has transitioned to the idle state within the EPS, transitions to the active state in order to transmit and receive communication data (S1202) (refer to TS 23.401, the 3GPP specifications). The lower-order 64 bits of the link-local address that was the origin of the Router Solicit (automatically generated by the TE device 41a, using the MAC address of the MT connection wireless communication unit 412) is held as the interface ID1 of the TE device 41.

Then, in order to establish the PDN connection 2 anew for the TE device 41a, a PDN Connectivity Request is transmitted to the MME device 22 (S1203). This PDN Connectivity Request includes the APN, the MNP type 1, and the interface ID1 of the TE device 41 acquired as noted above. The MME device 22 receives the PDN Connectivity Request and, to establish a PDN connection anew, transmits a Bearer Setup Request to the S-GW device 23 (S1204).

The Bearer Setup Request includes, in addition to the APN and MNP type 1 included in the PDN Connectivity Request of sequence S1203, the subscriber identification information, the IP address of the PDN-GW device 21c, the PDN connection ID2, MNP1, the interface ID1, and the EPS bearer ID2. The MNP and the interface ID may not be independent data elements. For example, the upper-order 64 bits of one information element may be used as the upper-order 64 bits of the MNP, and the lower-order 64 bits may be used as the interface ID.

The S-GW device 23 receives the Bearer Setup Request and begins the procedure for establishing the default EPS bearer for the TE device 41a with the PDN-GW device 21c. In the case in which GTP is used as the protocol for implementing the EPS bearer, the S-GW device 23 transmits the Bearer Setup Request to the PDN-GW device 21c (S1205). The Bearer Setup Request includes the subscriber identification information, the IP address of the S-GW device 23, the APN, the PDN connection ID2, the TEID2 for the S-GW, the MNP type 1, MNP1, the interface ID1, and the EPS bearer ID2.

In the case in which GRE is used as the protocol for implementing the EPS bearer, the S-GW device 23 transmits a Proxy Binding Update message to the PDN-GW device 21c. The Proxy Binding Update message includes the mobile network access identifier, the APN, the PDN connection ID2, the downlink GRE key 2, the MNP type 1, MNP1, and the interface ID1.

The PDN-GW device 21c receives the Bearer Setup Request of the sequence S1205 and starts the setup of the PDN connection 2 (S1206). First, in the case in which a specific IPv4 sub-network address and a specific IPv6 prefix are not specified in the MNP1, the PDN-GW device 21c allocates the IPv6 prefix 2 to the MNP1, from the address block pool managed by the PDN-GW device 21c, according to the MNP type 1. Then, the upper-order 64 bits of MNP1 are allocated to the upper-order 64 bits, and a new IPv6 address 2 to which the interface ID is allocated is generated, and the IPv6 address 2, as the PDN address of the established PDN connection 2, is allocated to the lower-order 64 bits. Additionally a default EPS bearer that is associated with the PDN connection 2 is established, and a user packet addressed to the IPv6 address 2 from the PDN is linked to the above-noted EPS bearer 2.

Then, the PDN-GW device 21c returns a Bearer Setup Response or a Proxy Binding Acknowledgment to the S-GW device 23 (S1207). In the case in which GTP is used, the Bearer Setup Response is used in the sequence S1207. This Bearer Setup Response includes the TEID2 for the PDN-GW, the PDN type 2, the PDN address 2, and the EPS bearer ID2. For the PDN type 2, the IPv6 address 2 is stored in the PDN address 2 as the address type of the ID address allocated to the PDN connection 2. In the case in which GRE is used, the Proxy Binding Acknowledgment is used in the sequence S1207. This Proxy Binding Acknowledgment includes the mobile network access identifier, the PDN connection ID2, the uplink GRE key 2, the PDN type 2, and the PDN address 2.

Additionally, the PDN-GW device 21c, using the EPS bearer 2, starts the transfer up to the S-GW device 23 of user packets from the external PDN 50 addressed to the IPv6 address (S1208).

Upon receiving the Bearer Setup Response or the Proxy Binding Acknowledgment of sequence S1207, the S-GW device 23 associates the PDN address 2, the subscriber identification information, and the MME device 22 and records these in a management table (PDN connection holding unit 231), and also transmits the Bearer Setup Response to the MME device 22 (S1209). The Bearer Setup Response includes the IP address of the S-GW device 23, the TEID2 for the S-GW, the PDN type 2, the PDN address 2, and the EPS bearer ID2. The S-GW device 23 also starts buffering of user packets transferred from the PDN-GW device 21c.

The MME device 22 receives the Bearer Setup Response and sends a PDN Connectivity Accept to the ENB device 31 (S1210). The PDN Connectivity Accept includes the IP address of the S-GW device 23, the APN, the PDN connection ID2, the TEID2 for the S-GW, the PDN type 2, the PDN address 2, and the EPS bearer ID2. The ENB device 31, upon receiving the PDN Connectivity Accept in the sequence S1210, transmits to the mobile terminal device 40c a PDN Connectivity Accept that includes the APN, the PDN connection ID2, the PDN type 2, the PDN address 2, and the EPS bearer ID2 (S1211).

The mobile terminal device 40c receives this PDN Connectivity Accept, acquires the PDN address 2, and also transmits to the ENB device 31 an RRC Connection Reconfiguration Complete that includes the EPS bearer ID2 (S1212). Because the subsequent sequences S1213, S1214, S1215, and S1216 are the same as the sequences S1013, S1014, S1015, and S1016 in the first embodiment, their descriptions have been omitted.

The mobile terminal device 40c that transmitted the RRC Connection Reconfiguration Complete at sequence S1212, extracts the IPv6 address 2 from the acquired PDN address 2, and transmits to the TE device 41a a Router Advertisement in which the 64 upper-order bits thereof are set as the IPv6 prefix (S1217). This Router Advertisement is a response to the Router Solicit of sequence S1201.

The TE device 41a receives the Router Advertisement and performs automatic generation of the IPv6 address, using the IPv6 prefix included in the Router Advertisement and the interface ID, and as a result the same address as the IPv6 address 2 is generated. Additionally, the TE device 41a executes DAD (Duplicate Address Detection) with the mobile terminal device 40c (S1218), and verifies that the generated IPv6 address is unique (S1218).

The TE device 41a, having verified by Duplicate Address Detection that the IPv6 address is unique, is able to transmit and receive user packets via the MT connection wireless communication unit 412. User packets addressed to the IPv6 address from the PDN-GW device 21c are transferred up to the mobile terminal device 40c via the S-GW device 23 and the ENB device 31, and the mobile terminal device 40c transfers them to the TE device 41a via the TE connection wireless communication unit 408 (S1219).

When the mobile terminal device 40c receives a user packet from the TE device 41a, the router function of the mobile terminal device 40c routes it in accordance with the transmission destination address of the user data. In the case in which the transmission destination address is MNP1 or the mobile terminal device 40c itself, the mobile terminal device 40c transfers it directly to the addressee. For any other transmission destination address, the user data is transferred to the EPS bearer 2 within the established PDN connection 2, the user data is transferred to the EPS bearer within the established PDN connection 2, and is transferred up to the PDN-GW device 21c and transmitted to the external PDN 50 by the PDN-GW device 21c (S1220).

The MME device 22, after receiving the Bearer Update Response of the sequence S1215, transfers the Location Information Update Request to the HDD device 24 (S1221). The Location Information Update Request includes information of the established PDN connection 2, and includes the APN, the PDN connection ID2, the IP address of the PDN-GW device 21c, the MNP type 1, and MNP1.

The HSS device 24, stores this information in the subscriber's subscription data so that when the mobile terminal device 40 re-attaches to the EPS (when, for example, the power is switched on/off) and performs a PDN Connectivity Request, the same PDN address prefix is allocated. The HSS device 24 also transmits the Location Information Update Request to the MME device 22 (S1222).

After the above, when a TE device 41b is connected to the mobile terminal device 40c, the sequences S1201 to S1222 are repeated, and a new PDN connection is established. However, the MME device 22 stores into MNP1 within the Bearer Setup Request transmitted to S-GW device 23 the IPv6 prefix already allocated to the TE device 41a, so that an IP address having the same IPv6 prefix is assigned to the TE device 41b as well. This process is applied to the all TEs subsequent to the second TE.

Although the present embodiment has been described for the example in which IP6V is used, the same type of processing is done in the case of using IPv4. In the case of IPv4, however, the interface ID is not used, and at sequence S1206 the PDN-GW device 21c generates an IPv4 address for the TE from one IPv4 sub-network address, and allocates this as the PDN address 2.

In this manner, by the TE devices 41a and 41b and the like establishing PDN connections for each TE, and PDN-GW device 21c or mobile terminal device 40c making assignment to separate EPS bearers for each TE IP address, even for one and the same communication party, it is possible to allocate different QoS classes and charging rules for each TE individually.

Fifth Embodiment

In the first to fourth embodiments, the IPv6 prefix allocated to the plurality of TEs and the IPv6 prefix allocated to the mobile terminal device 40 are different. In the mobile communication system 10d of the fifth embodiment of the present invention, the configuration is similar to that of the mobile communication system 10c of the fourth embodiment, the only difference being that, in place of the MME device 22, an MME device 22d is provided. By doing this, in this embodiment the same prefix is shared among the mobile terminal device 40 and the plurality of TEs.

Figure 20:
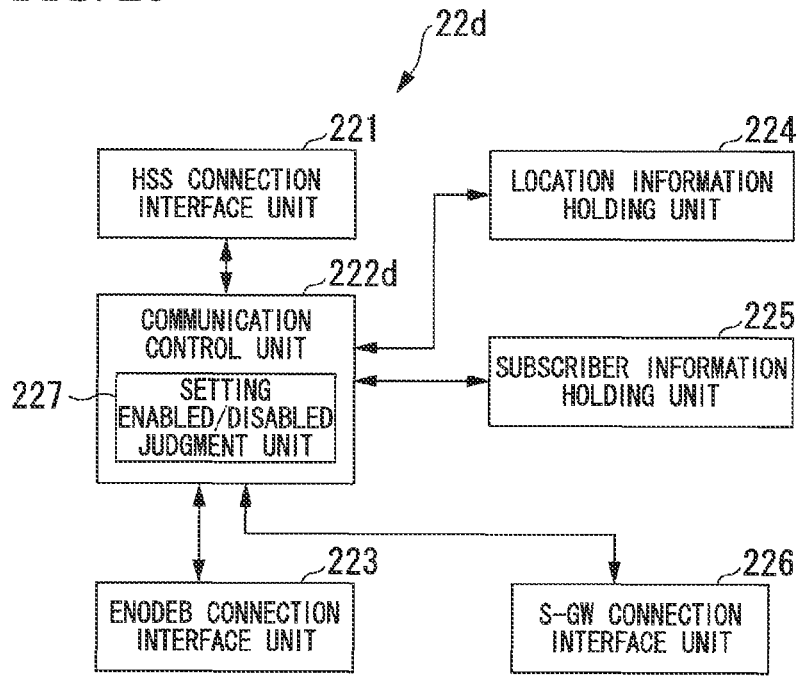
FIG. 20 is a simplified block diagram showing the configuration of an MME device 22d in a fifth embodiment of the present invention.

FIG. 20 is a simplified block diagram showing the configuration of the MME device 22d in the present embodiment. The MME device 22d has an HSS connection interface 221, a communication control unit 222d, an ENODEB connection interface 223, a location information holding unit 224, a subscriber information holding unit 225, and an S-GW connection interface 226. The communication control unit 222d has a setting enabled/disabled judgment unit 227. In this drawing, parts that are the same as in FIG. 4 are assigned the same reference numerals (221 and 223 to 227) and are not described herein. The only difference is that the communication control unit 222d differs from the communication control unit 222 in FIG. 4. In the following, only those parts in the present embodiment of the sequence that differ from that shown in FIG. 19 are described.

In the present embodiment, the communication control unit 222d of the MME device 22d that has received a PDN Connectivity Request in sequence S1203 extracts from within the subscription data the IPv6 prefix 1 assigned to the mobile terminal device 40. The MME device 22d then stores that value in MNP1 and transmits a Bearer Setup Request to the S-GW device 23 (S1204).

By doing this, in the sequence S1206, the PDN-GW device 21c allocates the MNP1 specified by the Bearer Setup Request, that is, allocates the PDN address that uses the IPv6 prefix allocated to the mobile terminal device 40 to the PDN connection 2. As a result, the same IPv6 prefix is allocated to the TE device 41a as is allocated to the mobile terminal device 40. Thereafter, even if a different TE connects to the mobile terminal device 40, the same type of processing is repeated. Therefore, IPv6 address that different only in the lower-order 64 bits are assigned to the mobile terminal device 40 and to the TE that connects to the mobile terminal device 40, enabling effective use of the address space for IPv6 addresses.

Sixth Embodiment

The sixth embodiment of the present invention is described below, with references made to drawings. The mobile communication system 10e in this embodiment has a configuration that is similar to the mobile communication system 10 in the first embodiment, and the only different is that, in place of the mobile terminal device 40, a mobile terminal device 403 is provided. By doing this, in contrast to starting the sequence for establishing the PDC connectivity, in the present embodiment PDN connectivity is established simultaneously with transmitting a packet to the external PDN 50.

Figure 21:
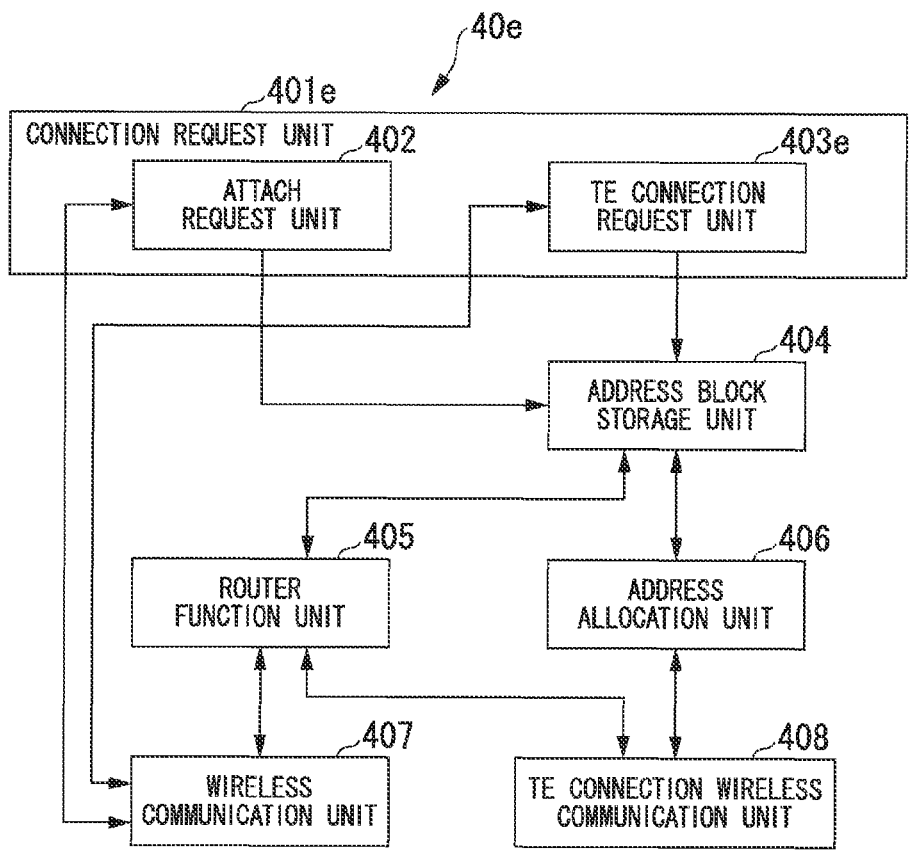
FIG. 21 is a simplified block diagram showing the configuration of a mobile terminal device 40e in a sixth embodiment of the present invention.

FIG. 21 is a simplified block diagram showing the configuration of the mobile terminal device 40e. The mobile terminal device 40e has a connection request unit 401e, an address block storage unit 404, a router function unit 405, an address allocation unit 406, a wireless communication unit 407, and a TE connection wireless communication unit 408. The connection request unit 401e has an attach request unit 402 and a TE connection request unit 403e. In this drawing, parts that are the same as in FIG. 7 are assigned the same reference numerals (402 and 404 to 408) and are not described herein. When the addressee of the user data received from the TE devices 41a and 41b is the external PDN 50, the TE connection request unit 403e makes a request of the core network 20 to setup a TE PDN connection, and receives from the core network 20 information indicating the address block allocated to the TE PDN connection setup by this request.

FIG. 22 is a drawing showing an example of the connection sequence for performing communication by the TE device 41a with the external PDN 50. This connection sequence example is the example of the sequence that starts from the condition in which the EPS attach sequence of the mobile terminal device 40 in the first embodiment shown in FIG. 9 has been completed. The mobile terminal device 40e stores in its own management information area beforehand the MNP1 for allocation to the TE. The method used may be that of storing a past setting, and alternatively can be the method of downloading from the core network 20 at the time of the EPS attach sequence of the mobile terminal device 40e.

First, the mobile terminal device 40e receives a Router Solicitation from the TE device 41a (S1301). The mobile terminal device 40e extracts the IPv6 prefix 2 from the MNP1 stored in the management information area and transmits the Router Advertisement that stores this to the TE device 41a (S1302). The TE device 41a generates an IPv6 address in accordance with the received Router Advertisement, and performs Duplicate Address Detection (DAD) of the generated IPv6 address with the mobile terminal device 40 (S1303).

For the case in which the mobile terminal device 40e receives a Router Solicitation from the TE device 41b as well, in the same manner, a Router Advertisement in which the IPv6 prefix 2 is stored is transmitted to the TE device 41b (S1305) and address generation of the IPv6 address and the Duplicate Address Detection are performed based on the Router Advertisement received from the TE device 41b (S1306).

When the TE device 41a receives user data via the MT connection wireless communication unit 412 (S1307), the mobile terminal device 40e receives that user data and verifies the transmission destination address of the user data. If the transmission destination address is MNP1 or the mobile terminal device 40e itself, rather than establishing a new PDN connection, the user data is transmitted to the transmission destination node (S1308).

If the transmission destination address does not coincide with the above (S1309), the mobile terminal device 40e judges that the user data is communication data directed to the external PDN 50, and performs establishment of a new PDN connection. The establishment of this PDN connection is done by performing the same processing as sequences S1002 to S1015 in the first embodiment shown in FIG. 10. After the PDN connection is established, user data transferred to the TE device 41 from the PDN-GW device 21 is transferred up to the mobile terminal device 40e, via the S-GW device 23 and the ENB device 31 (sequence S1016 in FIG. 10), and the mobile terminal device 40e transfers this user data to the TE device 41a (S1310). In contrast, user data that the TE device 41 transmits to the external PDN 50, is transferred up to the PDN-GW device 21, and the PDN-GW device 21 transmits it to the external PDN 50 (S1311).

The MME device 22, after receiving a Bearer Update Response in sequence S1015, transmits a location information update request to the HSS device 24 (S1312). This Location Information Update Request includes the information of the established PDN connection 2, the APN, the PDN connection ID2, address of the PDN-GW, the MNP type 1, and MNP1. The HSS device 24 stores this information in the subscriber's subscription data, so that when the mobile terminal device 40e again attaches to the EPS and makes a PDN Connectivity Request, such as when power to the mobile terminal device 40e is switch on/off, the same MNP1 is allocated. The HSS device 24 also transmits the Location Information Update Request to the MME device 22 (S1313).

When the PDD Connectivity Request in sequence S1011 is received, if the MNP1 extracted by the mobile terminal device 40e from the PDN Connectivity Accept for the TE does not coincide with the MNP1 held in the management information area by the mobile terminal device 40e, the mobile terminal device 40e transmits to the TE device 41a and the TE device 41b a Router Advertisement using the MNP1 acquired from the PDN Connectivity Accept. Additionally, the Router Advertisement using the MNP1 that was held in the management information area is transmitted with zero lifetime set, so as to prompt communication by only the IP address generated by the TE device 41a and TE device 41b from the MNP1.

In this manner, in the present embodiment, because a PDN connection is first established when communication to the external PDN 50 occurs, as long as the TE and mobile terminal device 40e are only communicating locally, it is not necessary to consume the resources of the core network 20 and the wireless access network 30.

A program that implements the functions of the PDN connection setting unit 212, and the user data transfer unit 215 in FIG. 2; the user data transfer unit 232 and the communication control unit 235 in FIG. 3; the communication control unit 222 in FIG. 4; the control unit 242 in FIG. 5 and the communication control unit 312 in FIG. 6; the connection request unit 401, the router function unit 405, and the address allocation unit 406 in FIG. 7 and the control unit 411 in FIG. 8; the connection request unit 401a, the router function unit 405, and the address allocation unit 406 in FIG. 12; the PDN connection setting unit 212, the user data transfer unit 215, and the DHCP server unit 217 in FIG. 14; the connection request unit 401, the router function unit 405, the address allocation unit 406, and the DHCP client unit 409 in FIG. 15; the PDN connection setting unit 212c and the user data transfer unit 215 in FIG. 17; the connection request unit 401c, the router function unit 405, and the address allocation unit 406 in FIG. 18, the communication control unit 222d in FIG. 20; and the connection request unit 401e, the router function unit 405, and the address allocation unit 406 in FIG. 21 may be stored in a computer-readable storage medium and the program stored in the medium read into a computer system and executed thereby so as to execute the processing of the various elements. The term "computer system" as used herein encompasses an operating system and hardware such as peripheral devices.

If the "computer system" uses the WWW system, it encompasses a webpage providing (or display) environment.

The "computer-readable storage medium" refers to removable media such as a flexible disk, an optomagnetic disk, a ROM, or a CD-ROM, and also to storage devices such as a hard-disk that are built into the computer system. The "computer-readable storage medium" also includes the short-term, dynamic holding of a program, such as in the case of transmitting a program via a network such as the Internet or via a communication line such as a telephone line, in which case the program is held for a given period of time, such as in a volatile memory within a server and client that serve as the computer system. The above-noted program may be for the purpose of implementing a part of the above-described functions, and the above-described functions may be implemented in combination with a program that is already stored in the computer system.

Although embodiments of the present invention are described above with reference made to the drawings, the actual configuration is not restricted to these embodiments, and encompasses changes in design that are within the scope of the spirit of the present invention.

INDUSTRIAL APPLICABILITY

The present invention is suitable for use in a mobile communication system but is not restricted to such use.

REFERENCE SYMBOLS

10: Mobile communication system
20: Core network
21, 21b, 21c: PDN-GW device
22, 22d: MME device
23: S-GW device
24: HSS device
30: Wireless access network
31: ENB device
40, 40a, 40b, 40c, 40e: Mobile terminal device
41a, 41b: TE device
50: External PDN
211: Address block holding unit
212, 212c: PDN connection setting unit
213: S-GW connection interface unit
214: PDN connection holding unit
215: User data transfer unit
216: PDN connection interface unit
217: DHCP server unit
221: HSS connection interface unit
222, 222d: Communication control unit
223: ENODEB connection interface unit
224: Location information holding unit
225: Subscriber information holding unit
226: S-GW connection interface unit
227: Setting enabled/disabled judgment unit
231: PDN connection holding unit
232: User data transfer unit
233: ENODEB connection interface unit
234: PDN-GW connection interface unit
235: Communication control unit
236: MME connection interface unit
241: MME connection interface unit
242: Control unit
243: Location information holding unit
244: Subscriber information holding unit
311: Wireless communication unit
312: Communication control unit
313: S-GW connection interface unit
314: MME connection interface unit
401, 401a, 401c, 401e: Connection request unit
402, 402a: Attach request unit
403, 403c, 403e: TE connection request unit
404: Address block storage unit
405: Router function unit
406, 406c: Address allocation unit
407: Wireless communication unit
408: TE connection wireless communication unit
409: DHCP client unit
411: Control unit
412: MT connection wireless communication unit

What is claimed is:

1. A mobile terminal device comprising:
a request unit configured to send at least a request message for establishing only one Packet Data Network (PDN) connection which provides connectivity to a PDN associated with an access point name (APN), the PDN connection being used only for a communication between an external gateway device and a plurality of information terminal devices which include said at least one information terminal device;
a reception unit configured to receive the APN, an evolved packet system (EPS) bearer ID, and an address block, the address block being allocated by the external gateway device to the PDN connection, and the EPS bearer ID being allocated to the PDN connection; and
an allocation unit configured to allocate an IPv6 prefix based on the address block to the at least one information terminal device, and transfer, based on the EPS bearer ID, user data as a router from the at least one information terminal device to the PDN associated with the APN via the PDN connection, wherein
the user data being transferred from the information terminal devices using an IP address configured based on the assigned IPv6 prefix.

2. The mobile terminal device according to claim 1, wherein
the address block is an IPv6 prefix shorter than an upper-order 64 bits.

3. An external gateway device comprising:
an establishment unit configured to establish only one Packet Data Network (PDN) connection by a request, from a mobile terminal device, for establishing the PDN connection which provides connectivity to a PDN associated with an access point name (APN), the PDN connection being used only for a communication between the external gateway device and a plurality of information terminal devices which include said at least one information terminal device and the mobile terminal device being connected to the at least one information terminal device;

an allocation unit configured to allocate an address block to the PDN connection, and notify the mobile terminal device of the address block;

the establishment unit configured to establish a connection with the at least one information terminal device via the PDN connection; and a reception unit configured to receive user data transferred by the mobile terminal device from the at least one information terminal device via the PDN connection based on an evolved packet system (EPS) bearer ID transmitted to the mobile terminal device, and the EPS bearer ID being allocated to the PDN connection, wherein the user data being transferred from the information terminal devices using an IP address configured based on the assigned IPv6 prefix.

4. An external gateway device according to claim 3, wherein the address block is an IPv6 prefix shorter than an upper-order 64 bits.

5. A mobile communication system comprising:

at least one information terminal device;

a mobile terminal device connected to the at least one information terminal device; and an external gateway device, wherein the mobile terminal device is configured to send at least a request message for establishing only one Packet Data Network (PDN) connection which provides connectivity to a PDN associated with an access point name (APN), the PDN connection being used only for a communication between the external gateway device and a plurality of information terminal devices which include said at least one information terminal device, the external gateway device is configured to allocate an address block to the PDN connection established by the request, and send the address block to the mobile terminal device, and the mobile terminal device is configured to:

receive the APN, an evolved packet system (EPS) bearer ID, and the address block, and the EPS bearer ID being allocated to the PDN connection, allocate an IPv6 prefix based on the address block to the information terminal device, and transfer, based on the EPS bearer ID, user data as a router from the at least one information terminal device to the PDN associated with the APN via the PDN connection, wherein the user data being transferred from the information terminal devices using an IP address configured based on the assigned IPv6 prefix.

6. A method comprising:

sending at least a request message for establishing only one Packet Data Network (PDN) connection which provides connectivity to a PDN associated with an access point name (APN), the PDN connection being used only for a communication between an external gateway device and a plurality of information terminal devices which include at least one information terminal device;

receiving the APN, an evolved packet system (EPS) bearer ID, and an address block, the address block being allocated by the external gateway device to the PDN connection, and the EPS bearer ID being allocated to the PDN connection; and allocating an IPv6 prefix based on the address block to the at least one information terminal device, and transferring, based on the EPS bearer ID, user data as a router from the at least one information terminal device to the PDN associated with the APN via the PDN connection, wherein the user data being transferred from the information terminal devices using an IP address configured based on the assigned IPv6 prefix.

7. The method according to claim 6, wherein the address block is an IPv6 prefix shorter than an upper-order 64 bits.

8. A method comprising:

establishing only one Packet Data Network (PDN) connection by a request, from a mobile terminal device, for establishing the PDN connection which provides connectivity to a PDN associated with an access point name (APN), the PDN connection being used only for a communication between an external gateway device and a plurality of information terminal devices which include at least one information terminal device and the mobile terminal device being connected to the at least one information terminal device;

allocating an address block to the PDN connection, and notify the mobile terminal device of the address block;

establishing a connection with the at least one information terminal device via the PDN connection; and receiving user data transferred by the mobile terminal device from the at least one information terminal device via the PDN connection based on an evolved packet system (EPS) bearer ID transmitted to the mobile terminal device, and the EPS bearer ID being allocated to the PDN connection, wherein the user data being transferred from the information terminal devices using an IP address configured based on the assigned IPv6 prefix.

9. The method according to claim 8, wherein the address block is an IPv6 prefix shorter than an upper-order 64 bits.

10. A method comprising:

sending at least a request message for establishing only one Packet Data Network (PDN) connection which provides connectivity to a PDN associated with an access point name (APN), the PDN connection being used only for a communication between an external gateway device and a plurality of information terminal devices which include at least one information terminal device;

allocating an address block to the PDN connection established by the request, and send the address block to a mobile terminal device;

receiving the APN, an evolved packet system (EPS) bearer ID, and the address block, and the EPS bearer ID being allocated to the PDN connection;

allocating an IPv6 prefix based on the address block to the information terminal device; and transferring, based on the EPS bearer ID, user data as a router from the at least one information terminal device to the PDN associated with the APN via the PDN connection, wherein the user data being transferred from the information terminal devices using an IP address configured based on the assigned IPv6 prefix.

* * * * *